(12) United States Patent
Weber et al.

(10) Patent No.: US 11,540,486 B2
(45) Date of Patent: Jan. 3, 2023

(54) ANIMAL LITTER AND LITTER BOX SYSTEM

(71) Applicant: Simply Paws Design, LLC, St. Paul, MN (US)

(72) Inventors: Patricia Lynne Weber, St. Paul, MN (US); Kevin Jon Weber, St. Paul, MN (US)

(73) Assignee: Simply Paws Design, LLC, St. Paul, MN (US)

( * ) Notice: Subject to any disclaimer, the term of this patent is extended or adjusted under 35 U.S.C. 154(b) by 63 days.

(21) Appl. No.: 16/996,397

(22) Filed: Aug. 18, 2020

(65) Prior Publication Data

US 2021/0051916 A1 Feb. 25, 2021

Related U.S. Application Data

(60) Provisional application No. 62/890,951, filed on Aug. 23, 2019.

(51) Int. Cl.
*A01K 1/01* (2006.01)
*A01K 1/015* (2006.01)

(52) U.S. Cl.
CPC .......... *A01K 1/0155* (2013.01); *A01K 1/0114* (2013.01)

(58) Field of Classification Search
CPC ....... A01K 1/01; A01K 1/0155; A01K 1/0114
USPC ...................................................... 502/400
See application file for complete search history.

(56) References Cited

U.S. PATENT DOCUMENTS

| | | | |
|---|---|---|---|
| 3,626,899 A | 12/1971 | Spellman | |
| 4,258,660 A | 3/1981 | Pris et al. | |
| 4,788,936 A | 12/1988 | Billings | |
| 4,913,954 A | 4/1990 | Mack | |
| 5,038,721 A | 8/1991 | Ouellette et al. | |
| 5,329,879 A | 7/1994 | Walton | |
| 5,740,761 A | 4/1998 | Lee et al. | |
| 5,924,383 A | 7/1999 | Smith | |
| 5,992,350 A | 11/1999 | Manzo | |
| 6,205,953 B1 | 3/2001 | Ginn | |
| 6,276,300 B1 | 8/2001 | Lewis et al. | |
| 6,287,550 B1 | 9/2001 | Trinh et al. | |
| 6,367,420 B1 | 4/2002 | Tomlinson | |
| 6,386,143 B1 | 5/2002 | Link et al. | |
| 6,408,790 B1 | 6/2002 | Maguire | |
| 6,568,349 B1 * | 5/2003 | Hughes | B01J 20/24 119/171 |
| 6,983,720 B2 | 1/2006 | Lakela | |
| 7,131,396 B2 | 11/2006 | Matsuo et al. | |
| 7,249,579 B2 | 7/2007 | Liang et al. | |
| 7,387,085 B2 | 6/2008 | Ikegami et al. | |
| 7,458,337 B2 | 12/2008 | Callan | |
| 7,673,585 B1 | 3/2010 | Emmi et al. | |
| 7,726,260 B1 | 6/2010 | Yananton | |
| 7,867,510 B2 | 1/2011 | Code | |
| 7,891,320 B2 | 2/2011 | Otsuji et al. | |
| 8,205,576 B2 | 6/2012 | Theis et al. | |
| 8,230,811 B2 | 7/2012 | Matsuo et al. | |
| 8,453,604 B2 | 6/2013 | Matsuo et al. | |
| 8,640,649 B2 | 2/2014 | Matsuo et al. | |
| 8,726,839 B2 | 5/2014 | Yamamoto et al. | |
| 8,733,286 B2 | 5/2014 | Sweetman | |
| 8,734,768 B2 | 5/2014 | Wang et al. | |
| 8,776,726 B2 | 7/2014 | Hillman | |
| 8,945,905 B2 | 2/2015 | Brandt et al. | |
| 8,960,127 B2 | 2/2015 | Miller | |
| 9,095,118 B1 | 8/2015 | Blankinship et al. | |
| 9,357,747 B1 | 6/2016 | Tsengas et al. | |
| 9,374,977 B2 | 6/2016 | Robbins | |
| 9,398,754 B2 | 7/2016 | Zhang et al. | |
| 9,549,532 B2 | 1/2017 | Raymond et al. | |
| 9,854,782 B2 | 1/2018 | Sogou et al. | |
| 9,888,666 B2 | 2/2018 | Takagi et al. | |
| 10,076,098 B2 | 9/2018 | Matsuo et al. | |
| 2002/0139313 A1 | 10/2002 | Mack, Jr. et al. | |
| 2004/0112297 A1 | 6/2004 | Rasner et al. | |
| 2004/0129230 A1 | 7/2004 | Northrop et al. | |
| 2005/0005869 A1 | 1/2005 | Fritter et al. | |
| 2005/0076844 A1 | 4/2005 | Lakela | |
| 2005/0263080 A1 | 12/2005 | Campbell et al. | |
| 2006/0027181 A1 | 2/2006 | Ikegami et al. | |
| 2006/0112893 A1 | 6/2006 | Ikegami et al. | |
| 2009/0199778 A1 | 8/2009 | Kratzer et al. | |

(Continued)

OTHER PUBLICATIONS

Invite to Pay Additional Fees dated Oct. 22, 2020 for International Application No. PCT/US2020/046806.
Invitation to Pay Additional Fees, and where Applicable, Protest Fee, dated Oct. 22, 2020 for International Application No. PCT/US2020/046806.

*Primary Examiner* — Edward M Johnson

(74) *Attorney, Agent, or Firm* — Seager, Tufte & Wickhem LLP

(57) ABSTRACT

A pelletized, environmentally friendly animal litter. The animal litter includes birch bark waste in pellet form that is mostly hydrophobic to allow liquid waste to quickly pass therethrough while trapping a small amount of waste therein that adheres to the surface of the pellet and is then absorbed over time. The litter is used in a litter box system that includes a base, a drawer slidably received therein for capturing waste in a preferred absorbent pad and a removeable grate suspended thereover for retaining the litter thereover. The drawer defines a container of sufficient volume to receive all of the litter when a standard amount of litter is used to fill the box which improves ease in changing litter by removing the grate and allowing the litter to drop into the drawer.

18 Claims, 28 Drawing Sheets

(56) References Cited

U.S. PATENT DOCUMENTS

| | | |
|---|---|---|
| 2009/0253943 A1 | 10/2009 | Edwardson et al. |
| 2009/0308323 A1 | 12/2009 | Van Nieuwenhuijzen-Van Rooijen et al. |
| 2010/0006035 A1 | 1/2010 | Spittle et al. |
| 2010/0086511 A1 | 4/2010 | Sakamoto |
| 2012/0006275 A1 | 1/2012 | Brenner |
| 2012/0034289 A1* | 2/2012 | De Leij ............ A01N 65/08 424/769 |
| 2012/0137982 A1 | 6/2012 | Skulan |
| 2012/0247394 A1 | 10/2012 | Nowacek |
| 2012/0260860 A1 | 10/2012 | Drief et al. |
| 2013/0167777 A1 | 7/2013 | Sweetman |
| 2013/0177620 A1 | 7/2013 | Jenkins et al. |
| 2013/0266657 A1 | 10/2013 | Frajkovska |
| 2014/0039644 A1 | 2/2014 | Dillingham |
| 2015/0181831 A1 | 7/2015 | Huck et al. |
| 2015/0196005 A1 | 7/2015 | Lipscomb |
| 2015/0240133 A1 | 8/2015 | Nakayama et al. |
| 2015/0245588 A1 | 9/2015 | Perorazio et al. |
| 2017/0223923 A1 | 8/2017 | Hasewaga et al. |
| 2018/0007861 A1 | 1/2018 | Mathis et al. |

\* cited by examiner

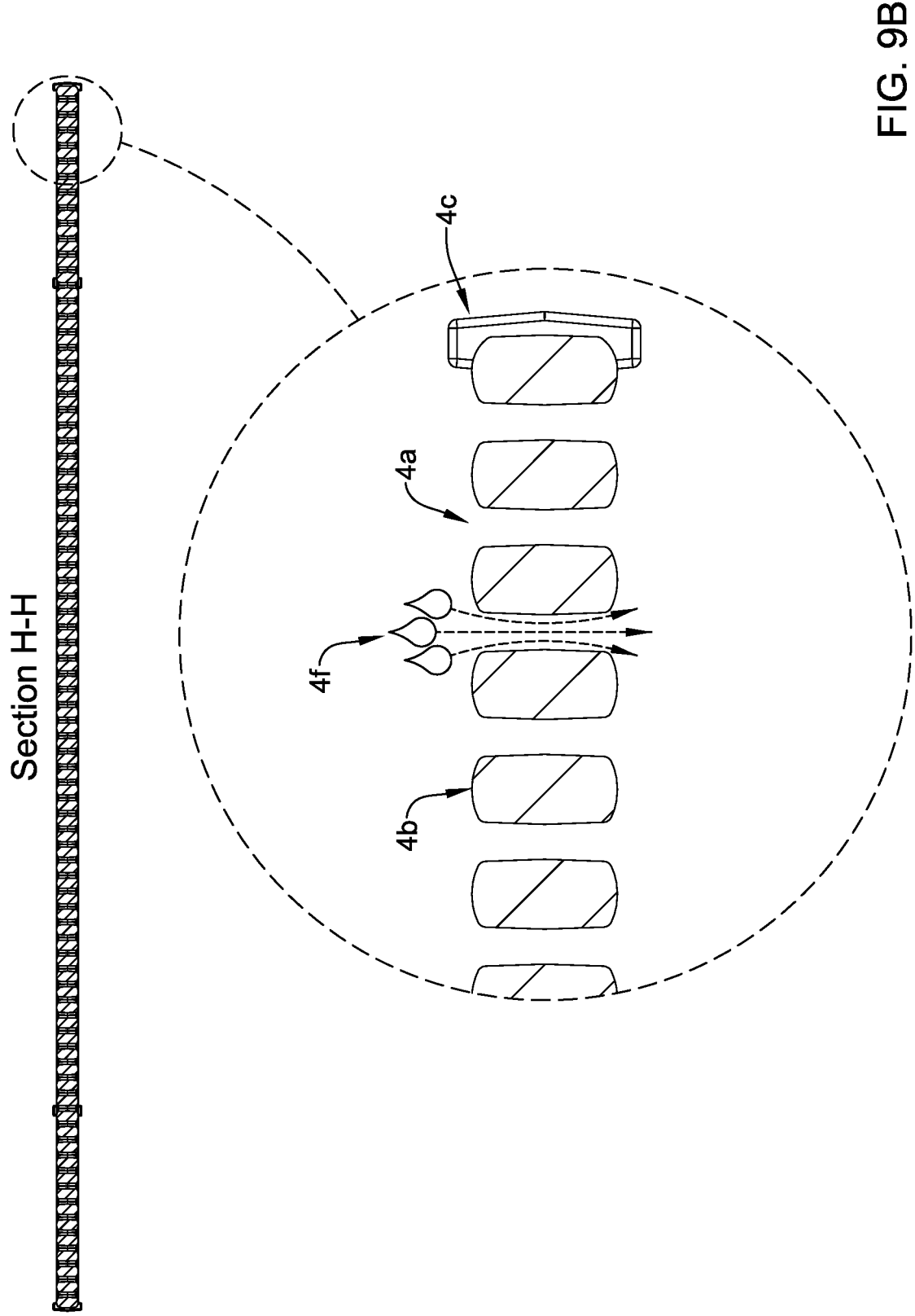

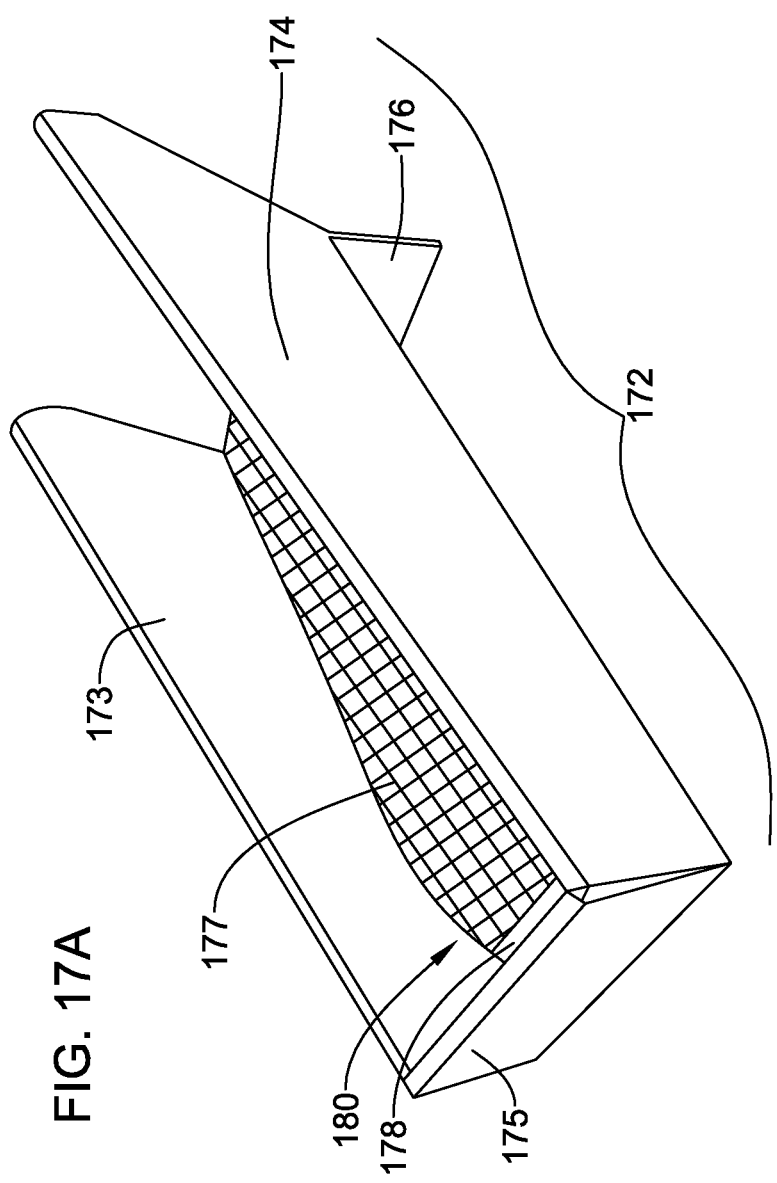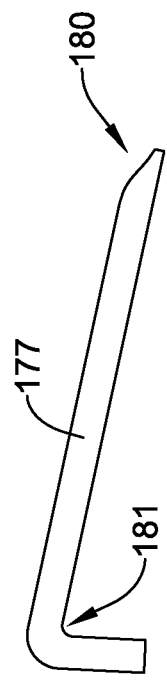
FIG. 17A
FIG. 17B

ANIMAL LITTER AND LITTER BOX SYSTEM

CROSS REFERENCE TO RELATED APPLICATIONS

This application claims the benefit of U.S. Provisional Patent Application Ser. No. 62/890,951 filed on Aug. 23, 2019, the disclosure of which is incorporated herein by reference.

TECHNICAL FIELD

The present disclosure pertains to animal litters for receiving animal waste and box-type systems utilized to retain the litter while interacting with the waste as it is deposited by the animal. More particularly, the present disclosure pertains to a pelletized cat litter made from natural, biodegradable and compostable materials and a cat litter box system that captures waste, reduces odor and improves handling of the waste and spent cat litter by the cat owner.

BACKGROUND

Animal litter and containers for litter called litter boxes have allowed animals, particularly cats, to reside inside owner's homes. However, many health and environmental issues have been identified with respect to materials and designs utilized for the litter and the litter box system containing the litter. The current disclosure of a litter and litter box system addresses the problems discussed below.

Many types of litter particulate are utilized with animal litter boxes, with most of them intended to absorb urine or other moisture and decrease odor. Animals, such as cats and dogs, tend to use their paws to kick litter particles to cover their feces and urine. To help mimic this natural behavior, litter is frequently at a depth of 1 inch or more and is often loose and granular. Traditional litter has been clay-based cat litter which was introduced in the 1940's, and sodium bentonite, a clumping cat litter, was introduced in the 1980's. Clumpable litters clump together with liquid waste and can be sifted together for removal of the clumps containing the waste. This creates much dust, and often pieces of the clumps containing urine and feces break off and remain in the litter box. Clay litters tend to be dusty, and frequently stick on cat's paws, and can be breathed by cats and their owners, along with being tracked all around their homes. Clay litters and dust may be ingested when animals clean themselves. Further, clumping clay litter can contain chemicals such as sodium bentonite and crystalline silica which have been associated with health issues developed by breathing or ingesting. Dust in cat litters can lead to respiratory problems in cats, especially kittens. Ingestion of these litters, or any non-biodegradable litter, with moisture absorption can lead to blockages and dehydration.

According to the United States Geological Survey Mineral Commodities Summaries 2020, in the United States in 2019, 5.27 billion pounds of bentonite clay and 4.32 billion pounds of Fullers Earth clay, for a total of 9.59 billion pounds of clay was mined for pet waste litters, and since clay is not biodegradable, most of that ends up in landfills as waste after use. Clay for litters is often strip mined, which is destructive to the land and harmful to wildlife. Clays are also heavy to transport and carry, utilizing much energy to do so.

Some alternative litters have been developed. For example, silica gel, made with sand and mixed with water and oxygen, is another popular litter material. It absorbs well, and lasts longer than clay litters, but it is another mined product, and therefore not sustainable, while adding significantly also to landfill waste. There are also plant based litters that are easier on the environment, including litter made from corn, wheat, beet pulp, pine, and other plant materials. These are all meant to absorb liquid excrement. The plant-based litters tend to be dusty and quite messy. They have granules that tend to stick to animal's paws and fur and are tracked around a home. There are wood based pellets, but they are designed to absorb liquid excrement and then fall apart when they get wet.

Because corn and wheat-based litters are edible, many animals will eat the litter. Aflatoxins may grow on these litters in the moist urine and feces environment that they are used. If transformed into mycotoxins, they could be deadly if ingested. Many litters have dust associated with them, including clays, silicate, wood, corn, and walnut, and the dust is amplified with pouring it out of a container into the litter box, and when the animal paws and kicks to cover its solid waste. This can be unhealthy for animals and can cause respiratory problems for both the animals and the people in the home.

Many litters also have added fragrances to mask bad odors associated with the liquid and solid waste in a litter box. Animals, particularly cats, are sensitive to many perfumes and deodorizers, which can cause them to avoid using their litter box, causing them to relieve themselves outside of the litter box. Cats urinating outside the litter box is the number one behavioral problem seen by veterinarians and the leading cause of cats being relinquished to shelters. In addition to having a large box, and avoiding fragrances, the latest research is showing that the most important factor in getting cats to consistently use their litter box, is to keep it clean.

Non-clumping non-water repellant litters also require frequent removal of the entire contents and cleaning of the box, which is wasteful, time consuming, and requires much maintenance. The clumpable litters require daily scooping, and need to be fully changed out less often, but little pieces and chunks of litter containing urine and feces break off the clumps and contaminate the litter and do require full removal and cleaning of the box as they contribute to odor while retained in the litter box.

Litters having some water repellant or pass through properties have been disclosed, such as those in Matsuo, U.S. Pat. Nos. 8,230,811 and 8,453,604, and Sogou U.S. Pat. No. 9,854,782. However, all the particles disclosed include inorganic porous material which must be mined or manufactured and are not biodegradable. After use they are landfill waste. Ikegami, in U.S. Pat. No. 7,387,075 discloses an animal litter that has a water shedding portion and a liquid absorbing portion on each litter particulate, where the shedding part is treated with a water repellant finish, so the repellency is just on the outside surface, and not throughout the litter particle.

In contrast to known animal litter, consumers are looking for alternative litters that are biodegradable, clay-free, silica-free, produce low dust, minimize tracking, have great odor control without fragrances, require minimal maintenance, and that are healthy and safe for cats, people and the planet.

In addition to animal litters, many types of litter boxes have been disclosed in the art to improve the overall waste capturing and clean-up operations. In Matsuo U.S. Pat. Nos. 6,994,054 and 7,131,396, the bottom part of the granular material container is detachable from the dripping container for cleaning purposes, but their design does not allow removal while the litter is still in the container, nor does it allow a means of directing of soiled litter into the reservoir formed by the drawer for easy removal of soiled litter. Further, the design does not allow the ability to change out the grate to allow different size grate openings. Many animals will accept a pellet litter, but others have more sensitive paws, and require a softer and smaller particulate size. Other pass through or filtering litter boxes, as in Matsuo, U.S. Pat. No. 10,076,098, require the upper side cover, or in Matsuo U.S. Pat. No. 9,888,666, require the upper container which holds the litter, and in Maguire U.S. Pat. No. 6,408,790, require that the whole litter containing part needs to be lifted and removed and put down on another surface to be cleaned, or carried unhygienically with soiled litter, to a larger space for cleaning and disposing of the litter and for cleaning of the entire box. Having to fully remove the litter containing parts to clean a litter box exposes any area in contact with it to animal excreta, is unhygienic, requires a large place and space to clean, and requires carrying a dirty litter container to an area to clean it. It also requires the carrying of a heavy, awkward, large container with soiled litter. Some of the soiled litter and particles can also fall through the holes that are in the bottom of the litter container as it is being moved. Many houses and apartments do not have spaces to allow easy, hygienic cleaning of a prior art litter box. Many people, particularly older seniors have difficulty lifting and carrying a heavy, large and awkward litter box.

In Matsuo U.S. Pat. No. 10,076,098, a pass-through litter box is disclosed that includes a shallow tray having therein an absorbent pad. The pad includes a non-absorbent (Lc) flap of the pad that can come into contact with the bottom wall of the side cover and become curled up. To avoid this, the length of the side wall (Lb) in FIG. 14, is to be larger than the length of the flaps. Due to this, it is difficult to shorten the fall length, as was their goal to decrease splattering of droplets. Their solution was to angle the tray side walls out to increase the total area of the bottom and side walls footprint to be larger than the liquid passable region of their litter tray. With the tray inserted, the fall length is reduced, but the flap lengths don't change. The pad flap size is limited by side wall length, 15 mm. When the absorbent portion of the pad is soiled, it's difficult to lift and carry the saturated pad with small flaps. A user ends up touching the absorbent portion of the soiled pad which is unsanitary and unpleasant and can also create leakage of liquid excrement when removing to dispose.

Another identified problem with current animal litters, whether clay, cellulosic, grains, pellets, silica or any material, is that they tend to get stuck in animal's paws, tracking litter particles and dust outside of the box creating a mess for the owner. The tracked litter and dust are unsanitary, malodorous, and can be gritty on surfaces all over the house. Animals also ingest the litter and dust with their meticulous grooming. Crystalline silica dust, a common ingredient in clumping litters, is a known carcinogen for both humans and household pets when inhaled.

Numerous methods have been used to address animals tracking litter outside the litter box. One approach is the use of various screens over basins or trays to collect loose litter. These have either been not cat friendly or not easy to use. Another approach to prevent litter tracking involves animal litter boxes that have ramps built inside the litter box. These can be difficult to clean and to keep clean. In U.S. Pat. No. 6,386,143, they attempt to collect and recycle litter by use of multiple elongated raised surfaces sitting over a tray positioned in front of a cat box entrance. In U.S. Pat. No. 8,181,601 it is disclosed to use sticky sheets to capture the litter from cats' paws, but cats avoid sticky surfaces. It fails to consider that cats have sensitive paws and will avoid a surface that is not to their liking, by either avoiding using the box and begin urinating and defecating outside of the box, or by jumping over the adverse surface.

In U.S. Pat. No. 6,983,720 they use louvered slats lined up to form a ramp over a tray. Again, louvered slats are undesirable to cats. U.S. Pat. No. 8,181,601 has a ramp with fabric on it to clean the paws and facilitate entering and exiting their specific cat box, but no means of catching any loose litter. Also, the ramp is only usable on their cat box. U.S. Pat. No. 5,992,350 has a tray that is underneath a cat box that can be pulled out, and a textured surface. This tray must be fully pulled out from under the cat box to be emptied, and does not direct the flow of loose litter to a place the cat would not step on again, so cleaning of the surface would need to be done each time the cat exited the box, or else the cat could pick up the loose litter from the tray and track it outside of the tray.

None of the prior US patents attempts to resolve the problem of animals tracking soiled litter and dust outside of their box and cleaning their paws in a way that is easy to use, easy to clean, easy to return loose litter back into the litter box, and that captures the loose litter, is low cost, is adaptable to many different cat box styles, and pays great attention to known cat and or animal preferences, and facilitates entering and exiting the litter box so it can be accessed by animals of all ages and physical abilities.

There is a great need and desire for an animal litter and litter box system that overcomes the above deficiencies in the prior art. In particular, the system would maximize odor reduction, minimize maintenance, clean easily, be healthy and safe for the animals using it and their human family members, and be environmentally friendly.

SUMMARY OF THE INVENTION

This disclosure provides design, material, manufacturing method, and use alternatives for an animal litter and litter box system. The invention provides an environmentally friendly animal litter and box system that minimizes odor, mess, and maintenance, is hygienic and easy to clean, is healthy and safe for animals, and allows health monitoring of urine. The litter box allows a means of cleaning so that it does not have to be fully taken apart and/or carried unhygienically to another location to be cleaned, decreases the frequency of changing out the litter and of cleaning the whole system, and simplifies and makes the process of removing the soiled litter and cleaning the litter box more hygienic.

In one embodiment, the invention is an animal litter box system that can have five major parts in some embodiments, including a bottom base with a solid flat bottom, a drawer/tray that slidably disposes within the base and that may be used with, but may be used without, an absorbable pad to capture liquid excrement. The drawer glides into and out of the base and a vertically seamless walled housing with three higher walls, and one anterior wall with a cut out opening for animal to go in and out. The housing is removably disposed over the base and engages via a perimeter flange. The housing has an open bottom that nests into the base and the inside drawer upper front. There is a liquid permeable removable grate removably disposed at the bottom of the housing that encourages the flow of liquid waste therethrough but prevents the passage of litter. The fifth element can be a ramp that attaches to the front anterior wall cut out, that facilitates entering and exiting of the box, and captures litter particulate and cleaning an animal's paws as they exit the box. The grate can cover the full width of the inside of the litter box to maximize walkable space for the animal and have rounded edges to facilitate liquid movement into reservoir drawer/tray and can easily be removed to pass the soiled litter into the reservoir drawer to dispose of the litter hygienically. The volume defined by the drawer is preferably greater than the volume of a standing filling of the litter box with a layer of litter up to 2.5 inches deep. Having a removable grate also allows changing out the grate to allow varying sizes of openings to allow various sizes of litter particulate.

The invention can include an animal litter used in a (filtering) litter box which has superior odor control, requires much less maintenance as it lasts up to 30 days, is made with all-natural ingredients and is safe for animals, people and the planet. The animal litter is substantially hydrophobic, and a little hydrophilic. The animal litter is an all-natural, eco-friendly, biodegradable, sustainable, low dust, anti-tracking, naturally antibacterial and naturally anti-fungal, clay-free, silica free animal litter that decreases ammonia and filters liquid excrement into a reservoir drawer that may be used with or without an eco-friendly pad to absorb the liquid waste.

In one embodiment, the litter is pelletized birch bark waste. The birch bark waste does not require the separation of inner and outer birch bark, has a high pass through or low sorbency rate, less than 25%, and preferably a sorbency rate less than 10% as measured with a drip-test. Further, the pelletized birch bark waste has high dry durability, 80-100%, preferred 95-99%, and low inhalable dust. Further, in a qualitative wet durability test, the birch bark waste pellets maintain their pellet shape or structure, in other words, even though they do have some hydrophilicity, the pellet does not fall apart substantially when wetted and a small portion of the liquid is absorbed. The birch bark waste pellets are mostly hydrophobic, so initially most liquid excrement passes over the litter, through the grate, and into the reservoir drawer. Any remaining urine should be absorbed by the litter, (hydrophilic), and held in it so no remaining free urine is left in the litter containing portion of the litter box to dry and create odor.

In some embodiments, the birch bark waste contains both birch bark and bole wood. The birch bark can be present in concentrations up to 90%, preferably about 50% to about 90%. The bole wood can be present in concentrations from about 10% to 40%. In manufacturing the pellets, the pelletizing has a compression ratio of about 6:1 to about 9:1 in order to create a preferred hydrophobic/hydrophilic surface on the pellets as discussed herein.

In some preferred embodiments the litter box system includes a waste absorbing pad that is retained within the drawer during use. The absorbent pad is for capturing liquid animal waste and can include a water impervious outer layer; a water permeable inner layer and at least one middle layer including a fluff material having a super absorbent polymer dispersed therethrough, wherein the inner and outer layers cover both an outer perimeter of the pad and a central absorbing portion while the middle layer is absent from a portion of the outer perimeter. The pad can further include retention means on the outer perimeter of the pad for retaining the position of the pad within a collection drawer of an animal litter box. The retention means can be a drawstring slidably disposed in a channel formed in the perimeter of the pad, four tabs on the outer perimeter of the pad that releasably engage the over-run flange formed in the collection drawer of the animal litter box or alternatively C-shaped perforations extending from the outer perimeter of the pad to engage corners of the collection drawer of the animal litter box. Alternatively, the retention means can include a taut stretchy outer perimeter of the pad to go over the upper over-run flange of the collection drawer. Each of these designs hold the absorbable pad in position while moving the drawer in or out of the base.

The present disclosure can further include a ramp for ingress and egress from a litter box. The ramp can preferably contain two components, a bottom outer base ramp and a ramp insert. The bottom base ramp has a lower tray area for receiving the ramp insert, and an attachment and flap that engages the entrance edge of a litter box to retain a desired position for ingress and egress. The ramp insert nests into the inside of the bottom outer base ramp, has an upper surface which loosens litter from animal paws, and tapers toward the base ramp lower back rail creating an area to capture the loosened litter preventing it from tracking outside of the ramp. An alternate embodiment has the ramp insert nested within the bottom base ramp and extending over a portion of its length so that loosened litter drops into the lower tray.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which:

FIG. 8 is perspective view of an embodiment of a grate for receiving waste there through;

FIG. 9B is an enlarged cross-sectional view of the pass-through openings in the grate of FIG. 8;

FIG. 17A is a perspective view of an alternate ramp;

FIG. 17B is a plan view of an alternate ramp insert for the ramp of FIG. 17A;

Figure 1:
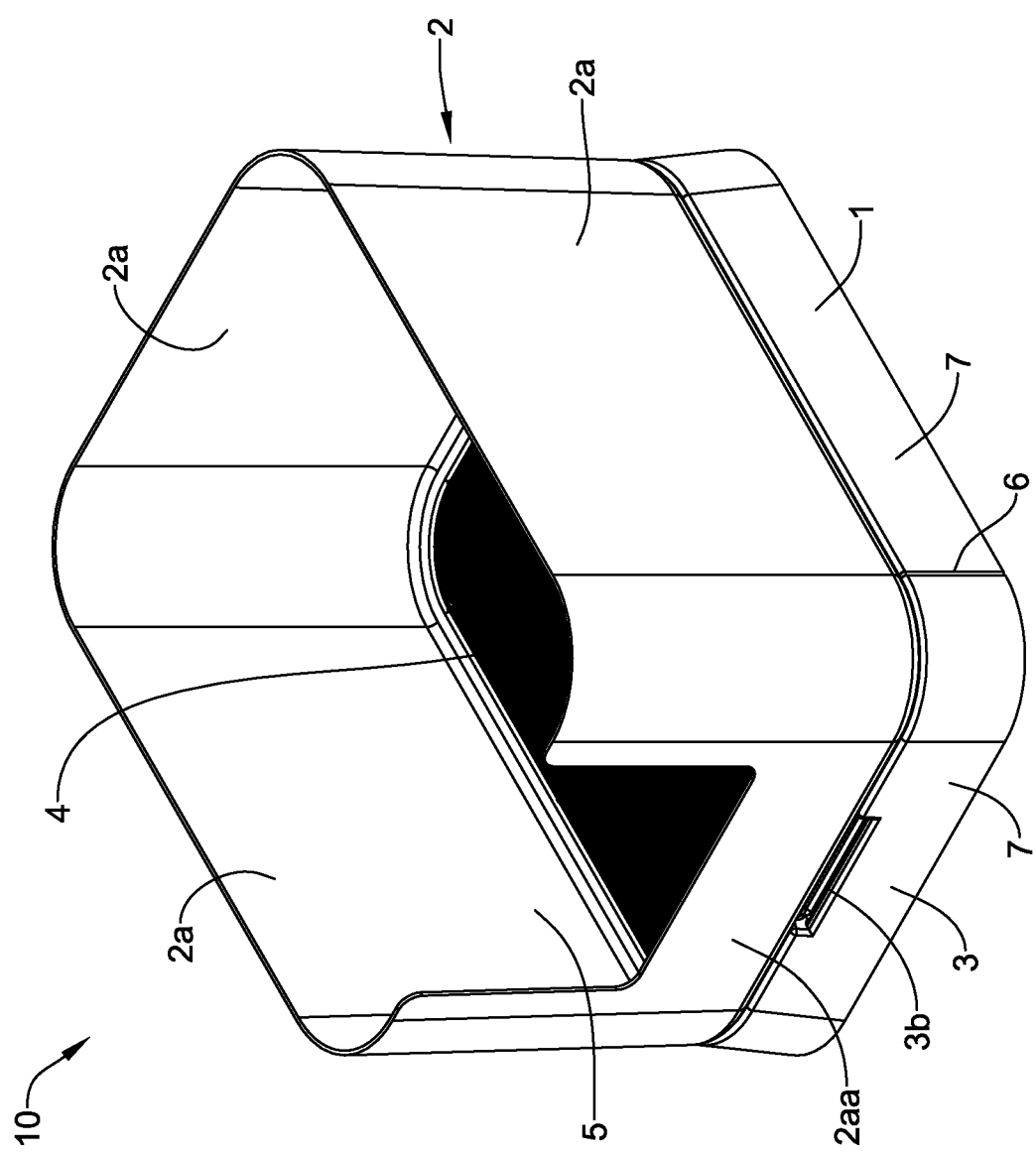
FIG. 1 is a perspective view of an embodiment of the animal litter box according to present invention.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the disclosure.

DETAILED DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the features, structures, and/or characteristics. Additionally, when features, structures, and/or characteristics are described in connection with one embodiment, it should be understood that such features, structures, and/or characteristics may also be used in connection with other embodiments whether explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the invention.

The present invention relates to animal litter for all animals, including cats, dogs, rabbits, ferrets, horses, or any animal that utilizes litter for urination and defecation. The litter is comprised of ingredients that are biodegradable, environmentally friendly, scent-free, minimize dust, minimize tracking, and minimize odor. The litter is designed to be used in some embodiments with a litter box system with liquid passing through a grate and means of capturing liquid animal excretions below the grate. The animal litter has primarily liquid passing properties to transfer most of the liquid waste into the drawer, with or without the use of an absorbent pad in the drawer. Any remaining liquid waste is absorbed by the litter and held onto within the litter particulate, allowing use of litter for long periods of time, while minimizing odor.

Figure 16B:
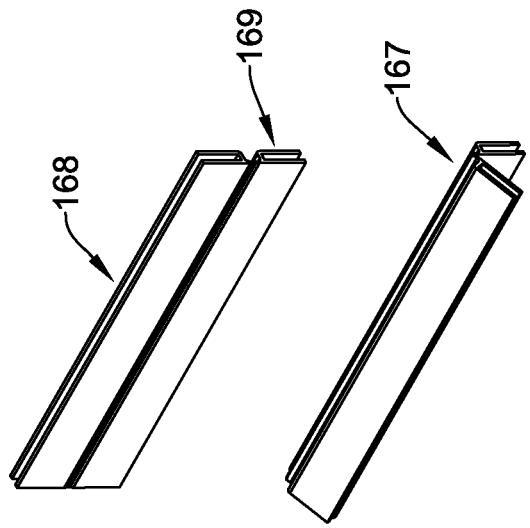
FIG. 16B depicts the living hinge used to adjust the ramp.
Figure 16A:
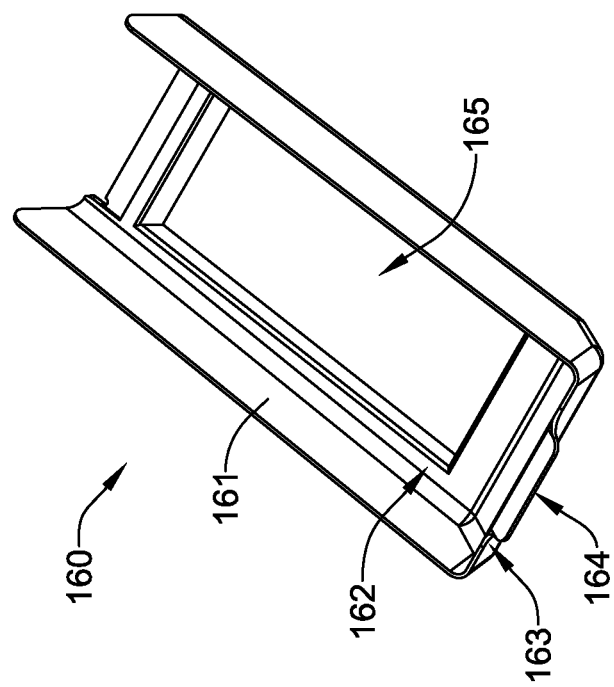
FIG. 16A is a perspective view of an embodiment of a ramp.

The present invention relates to an animal litter system including an animal litter box that can include a litter capturing ramp 160 (see FIG. 16A), 172 (see FIG. 17A) or 182 (see FIG. 23), an animal litter 12a, and a liquid waste absorbent pad 13a. The animal litter box separates out the liquid waste, and the animal litter particulate is selectively manufactured so it mostly repels the liquid waste, but it also absorbs any liquid waste that doesn't pass through to prevent odor formation. Therefore, the litter is mostly hydrophobic, but it also imparts hydrophilic characteristics. The animal litter particulate is also environmentally friendly, biodegradable, non-toxic, has low dust, emits low ammonia, is unscented, is lighter than clay litter, shaped to minimize animal tracking, and able to be put into a compost pile. Due to the minimal absorption and minimal ammonia, the animal litter is long lasting, and healthy and safe for both animals and their caretakers. It is naturally anti-fungal, antibacterial and anti-viral due to triterpenes present in the birch bark waste utilized. Further there is natural hydrophobicity due to betulin in the birch bark.

The animal litter particulate matter of the present invention is described below with preferred embodiments. As used here, "birch" is any of the many deciduous trees of the genus *Betula*. The particulate matter used in the present invention is mainly composed of birch bark waste, which is a low value waste product in the forest industry. Birch bark waste is generated when birch logs are debarked. Bole is the tree trunk from the ground to the crown break. The bole doesn't include major branches supporting the tree crown. Bole wood is the section of the bole that is utilizable for a commercial product and is cut square at both ends to be made ready for delivery for processing. In the debarking process, the wood that remains adhered to the bark is bole wood. Birch bark can be further divided into outer birch bark and inner birch bark. The process of separating the outer birch bark from the inner birch bark to make outer birch bark pellets to extract beneficial organic chemicals is known and requires laborious work in the separation process, and creates an expensive pellet that is cost prohibitive to use as an animal litter.

The present invention provides methods for producing a cost-efficient litter and a process for a blended (both inner and outer birch bark and bole wood combined) birch bark litter pellet with mostly hydrophobic characteristics, but also with hydrophilic characteristics to be utilized with a pass-through animal litter box system.

Birch bark waste is obtained from a sawmill or paper mill. Depending on time of year, the ratio of birch bark to bole wood can vary. A birch bark waste blend of 40-90% birch bark and 10-60% bole wood are the ratios that are most common throughout the year, with winter having a higher bole wood content due to freezing and less ease of debarking the tree. A preferred embodiment uses a ratio of 50-80% birch bark to 20-50% bole wood to produce the best animal litter pellet. A lower birch bark content creates too much liquid absorption and not enough liquid pass through. With less birch bark, there is less hydrophobicity, and therefore more hydrophilicity. With more hydrophilicity, the litter particulate can break apart faster, and not last as long.

One or more materials may be utilized as additions to the birch bark waste in some embodiment, such as other hardwood or softwood tree bark waste, including, but not limited to aspen, pine, fir and maple bark waste, the outside of fruit, nuts, rice, seeds, including but not limited to shells, hulls, husks, agricultural products (coffee chaff, sunflower hulls, wild rice hulls, pistachio shells, safflower hulls), and other pulverized wood materials may be combined with the birch bark waste to make the animal litter.

The litter particulate matter produced for the present invention may be formed by a disk pelletizer, a briquette machine, a tableting machine or similar. In one embodiment, the preferred method is the disk pelletizer due to availability and price. Ideal pre-pelleting or forming moisture levels range from 12-15% prior to entering the pellet die, or other. However, the wood industry seldom uses steam to maintain final pellet moisture at a minimum. Steam is only utilized to start pelleting if moisture content is below ideal ranges. If steam is required, use a high pressure 46 Kw (5 HP) Chromalox electric steam boiler, or similar, with a set pressure of 65 psi (high pressure).

Prior to grinding, the birch bark waste may need to be dried if moisture content is too high. Birch bark waste may be air dried or dried in a machine known in the art such as a rotating dryer. Final moisture of the product is in a range from 6-13% and preferred in the 8-11% range.

When the animal litter particulate is formed into a cylindrical pellet shape, the average diameter range is from 3-8 mm, and preferably 4-7 mm. The average individual particulate length is 3-30 mm, and preferably 6-10 mm. An animal such as a cat prefers small litter particulate, but if the particulate is too small it tends to get caught in the animal's paws and creates tracking of the litter particulate around the house. Also, the litter particulate needs to be large enough to not fall through or get stuck in between the bars of the grate. An advantage of a removable grate is that you can have different litter particulate sizes with different grate open space sizes between bars.

It is preferable that the amount of water absorbed in a water sorbency drip-test is in the range of 0.01-0.20 water absorbed/product used (g/g) or 1% to 20%. In the sorbency drip-test, a lower sorbency number indicates a lower affinity to attract and absorb water. This means that more liquid waste is repelled from the litter particulate, and therefore the litter lasts longer as there is less particulate deformation, less particulate disintegration, and less odor.

The sorbency can be measured with the sorbency drip-test method which focuses on exposure time, density, and sorbent ability. Pelleted litter is weighed and placed into a cylinder. Then 100 grams of water is poured through the cylinder and pass-through water is collected after 5 minutes and weighed. Product sorbency is a calculation of water retained divided by the starting mass.

The preferred pellet durability is above 90%, and more preferred to be above 98%. With lower particulate durability, the litter particulate may break down with distribution, or with animals walking on them, and it may shorten length of time the litter is able to be used.

The durability is measured using the Kansas State University Pellet Durability Index Score (PDI). The test measures the durability of a dry pellet before being exposed to moisture, such as cat urine in use. Durability of pellets should be determined by tumbling the test sample for 10 minutes at 50 r.p.m. in a dust-tight enclosure, starting with a consistent weight of pellets, and starting immediately after cooling. When the temperature of the pellets is within ±10 degrees)(° Fahrenheit of ambient, they are considered cool. The device is rotated around an axis that is perpendicular to and centered in the 12 inch sides. A 2 inch by 9 inch plate is affixed symmetrically along one of its 9 inch sides to a diagonal of one 12 inch by 12 inch side of the can. A door may be placed on any side and should be dust-proof. Projections, such as rivets and screws, should be kept to a minimum and well rounded.

A sample of pellets to be tested should be sieved on the appropriate sieve to remove all fines. Fines shall be determined by screening a sample on a wire sieve having openings just smaller than the nominal pellet diameter. If pellets of 0.5 inch diameter or larger are being tested, select pellets that are between 1.25 inches and 1.5 inches long. Place a 500-gram sample of sieved pellets in the tumbling can device. After tumbling for 10 minutes, the sample will be removed, sieved, and the percent of whole pellets calculated. Pellet durability is defined as: Durability=weight of pellets after tumbling (g) divided by weight of pellets before tumbling (500 g)×100.

Inhalable dust is currently classified as dust particles less than 10 micron. Peak dust is the highest recorded concentration of dust less than or equal to 10 microns during a test period. Concentration values are stated as milligrams per cubic meter. The preferred least amount of inhalable dust is less than 10 milligrams per cubic meter. For respiratory health of both the animals and the humans residing in the animals' house, the least amount of dust is most desirable. National Optical Astronomy Observatory states that the risk of particulate exposure for entering the respiratory system can be determined by the length of exposure, concentrations, and most importantly, the size of the dust particle.

To evaluate the level of inhalable dust generated through handling of material, a DustTrak® monitor is utilized to filter and read dust concentrations utilizing light scattering technology. For each individual test, a 100 gram sample is evaluated. Sample is analyzed for inhalable dust less than 10 microns. Document current temperature and humidity. Use a 32 inch collectively in total drop tube height, and a collection box. Drop litter down the tube and into a collection box. The sample and dust generated are captured in a box at the bottom of the tube with an air outlet port at the side of the box. Test utilizing a 10 micron filter.

It is preferable that as small of an amount of ammonia NH3 be generated as possible, less than or equal to 0.1 ppm at 1 hour and 24 hours after exposure. Measure a level of ammonia generated on litter particulate using a Drager tester. The procedure to evaluate ammonia control of animal litter particulate is as follows.

1. Fill a 250 ml plastic measuring cup with two test litters. Litter should be added to reach a level that is 1 inch below the top of the rim.

2. Test liquid utilized is four parts water with one part 5% ammonia hydroxide or household ammonia (4:1). This level of ammonia is utilized to serve as an "index". For performance and should provide a detectable level for comparison. Synthetic urine contains only 1.0 E-4 percent (%) ammonia, producing very limited levels of ammonia for performance testing.

3. Using a pipe tote, add 5 ml of solution to each cup.
4. Wait 1 hour.
5. Document room temperature and humidity.
6. Using the Drager tester with the 5-30 ppm tubes, test each litter and document NH3 levels obtained.
7. Repeat steps 1-3 and wait 24 hours. Then repeat steps 5-6.

A preferred method of manufacturing by pelletizing of the animal litter is described. Moisture content range of the birch bark waste should be from 12-15%.

Prior to pelleting, the birch bark waste product is ground using a 25 HP, 22-inch Champion brand hammer mill rotating at 3,600 r.p.m. With a 3/16-inch hole screen for the first pass followed by a 1/8-1/16-inch screen for the second pass.

Pellet die size utilized for production for a preferred embodiment included a 6:1 compression ratio CR (compression ratio=die length/hole diameter) to a 9:1 compression ratio CR, with a die diameter of 3 mm-7 mm. A thicker die with a greater compression ratio produces a product with improved performance. Pelleting for the trial was conducted on a 60-Hp California Pellet Mill. The pellet mill runs using 220V/3 phase electricity. Operating idle amperage is 16 A and full load amperage is 70 A.

In a first representative litter that was manufactured, the present invention is a pelletized animal litter particulate and method of production as described in detail below. Birch bark waste comprised of 80% birch bark and 20% bole wood were utilized. Initial starting moisture content was 13.5%. Prior to pelleting, the birch bark waste product was ground using a 25 HP, 22-inch Champion brand hammer mill rotating at 3,600 r.p.m., with a 3/16 inch hole screen for the first pass followed by a 1/8 inch screen for the second pass. Pellet die size utilized for production for a preferred embodiment included a 6:1 compression ratio CR (compression ratio=die length/hole diameter). The die diameter was 1/4 inch. A thicker die with a greater compression ratio produces a product with improved performance. In particular, it has been found that the compression ratio impacts the durability of the pellets in a wet test. This is a qualitative test in which pellets are placed in a liquid for a period of time. After such time, the pellets are observed to determine if they retain their pellet shape and defined exterior surface. This quality is both a function of the compression ratio and the materials used. As it is desirable to have some hydrophilicity as stated above, there is some liquid absorbed into the pellets on each use by the animal. If the pellet breaks down when wetted, it will not last in the litter box and become problematic from many perspectives. Therefore, it is preferred that pellets of the present invention have the previously stated sorbency range while substantially maintaining pellet form over the period of use between litter changes. Pelleting for the trial was conducted on a 60 HP California Pellet Mill. The pellet mill runs using 220V/3 phase electricity. Operating idle amperage is 16 A and full load amperage is 70 A.

The animal litter of a second representative litter that was manufactured followed the same methods as the first representative litter, except that the compression ratio included a 7:1 compression ratio. The die diameter was 1/4 inch.

In a third representative litter that was manufactured, the same methods of the first representative litter were followed, except that the birch bark composition was 60% birch bark, and bole wood was 40%. The compression ratio was 8:1, with a 1/4 inch die width.

Properties of the three representative litters that were manufactured were tested along with comparing properties under the same tests for a commercially available litter sold under the Tidy Cats® Breeze® label and a generic clay pellet litter. The results of these tests are presented in Tables 1, 2 and 3 below. The superior properties of pellets of the present invention are evident, especially the second representative sample.

TABLE 1

| Product | Pellet Die Utilized | Pellet Durability (%) | Water Absorbed/Product Used (g/g) | Final Pellet Moisture (%) |
| --- | --- | --- | --- | --- |
| First Preferred Embodiment: 80% birch bark/20% bolewood | 1/4 in × 6:1 CR | 95.8% | 0.19 | 10.2% |
| Second Preferred Embodiment: 80% birch bark/20% bolewood | 1/4 in × 7:1 CR | 98.5% | 0.09 | 9.3% |
| Third Preferred Embodiment: 60% birch bark/20% bolewood | 1/4 in × 8:1 CR | 97.9% | 0.13 | 9.3% |

TABLE 2

| Peak Dust Concentration | |
| --- | --- |
| Product | Peak 10 micron |
| First Preferred Embodiment 80/20. 6:1 CR | 6.1 |
| Second Preferred Embodiment 80/20. 7:1 CR | 6.7 |
| Third Preferred Embodiment 60/40. 8:1 | 5.8 |
| Tidy Cats Breeze | 18.3 |
| Tidy Cats 24/7 (prilled) | 27 |
| Clay Granulated Litter | 150 |

TABLE 3

| Product | Ammonia Level at 1 hour (ppm) | Ammonia Level at 24 hours (ppm) |
| --- | --- | --- |
| Second Preferred Embodiment 80% birch bark/20% bolewood | 0 | 0 |
| Tidy Cats Breeze Pellet | 0.45 | 0 |

The animal litter of a fourth embodiment was the same as above in all three embodiments, and then adding either into the ground mix, or by spraying in after pelletizing, a bio-based odor neutralizer such as but not limited to Itaconix® ZINADOR™ 22L, which is an odor neutralizing chemical that is a polymeric zinc itaconate complex that is 100% bio-based.

Another alternative embodiment would be same as above and add another one or two organic ingredients into the ground mixture, such as but not limited to hulls or shells of nuts, seeds, fruit, or grasses.

Figure 2:
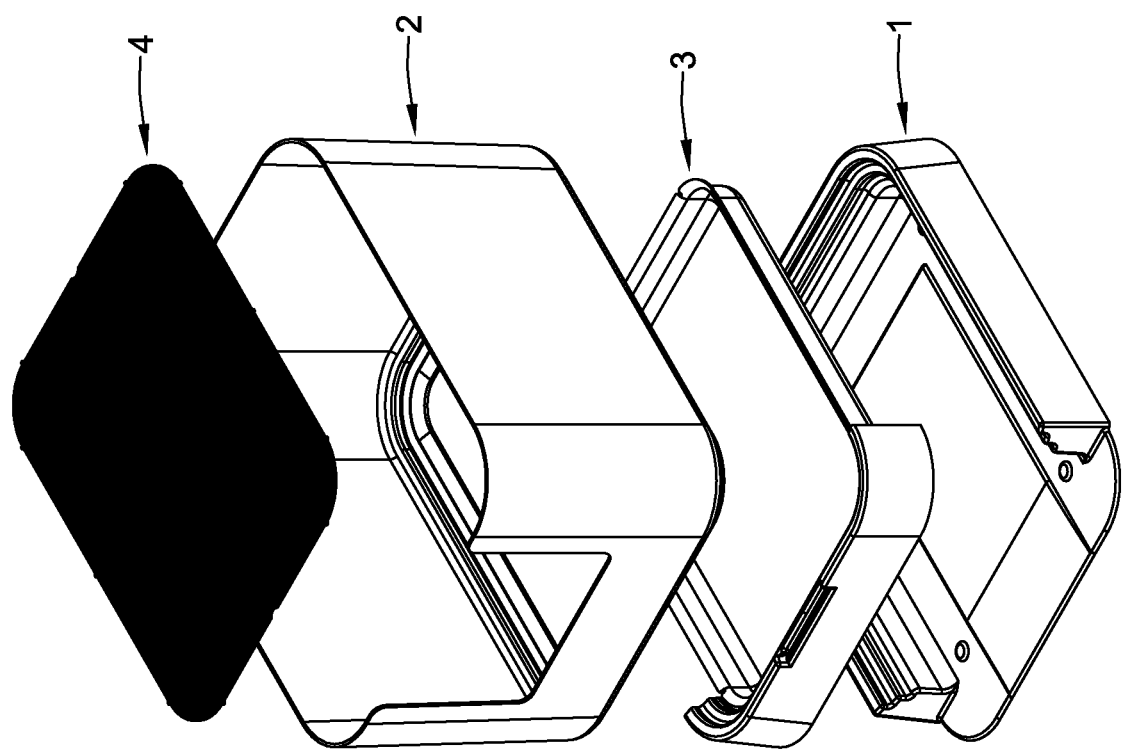
FIG. 2 is an exploded view of the embodiment of the animal litter box according to FIG. 1, depicting major components.
Figure 16D:
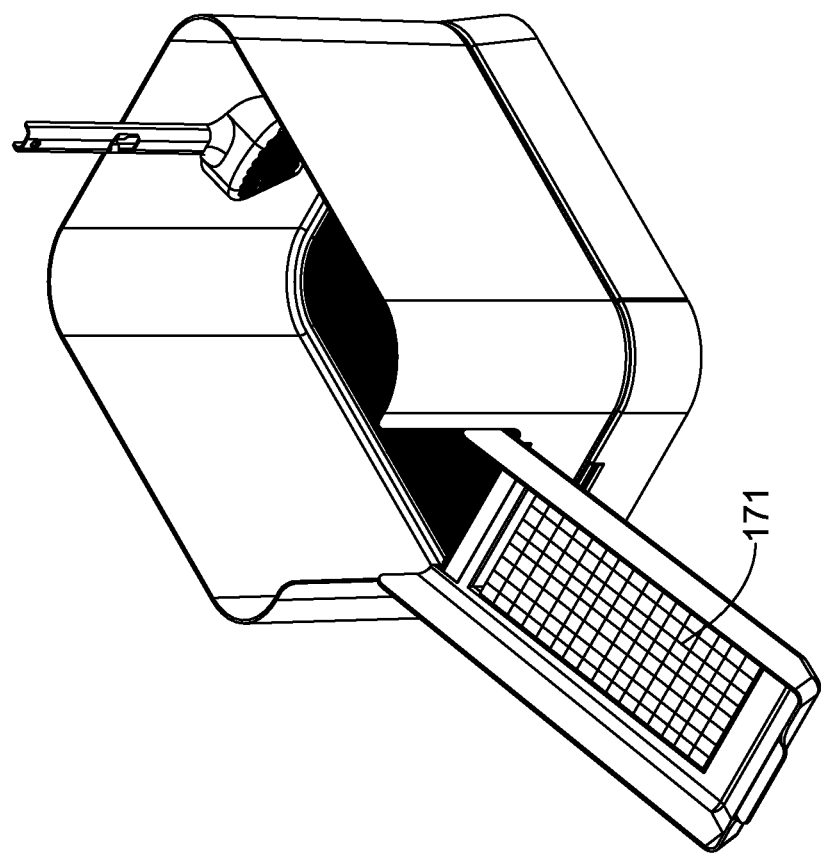
FIG. 16D is view of the ramp as positioned for use.
Figure 16C:
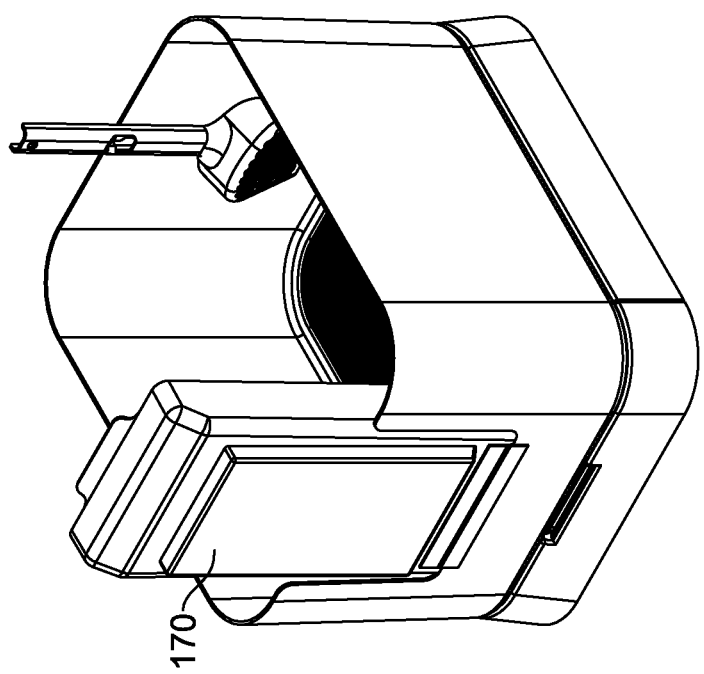
FIG. 16C is a view of the ramp of FIG. 16A as attached to litter box with ramp emptying.

As shown in FIGS. 1-2, an overall perspective view of an animal litter box according to the present invention is depicted with drawer 3 in the inserted or closed position, and configured to have main components of base 1, on the bottom with 3 sided flange; wall 2, with 4 vertical side walls and bottom flange which rests on base and drawer totally enclosed retainment flange, 8 (see FIG. 11); with drawer 3 to house absorbent pad 13a (see FIG. 13) or liquid waste, which when inserted to proper position resides underneath the grate 4; Grate 4, which supports litter particulate, litter particulate 12a (see FIG. 12), and ramps 160 (see FIGS. 16A, 16B and 16D) and 172 (see FIG. 17A) which attach to wall 2. A predetermined amount of liquid repellent litter is dispersed over the grate 4 to a preferred depth. The liquid absorbing pad 13a (see FIG. 13) resides within the drawer. An alternative embodiment is to not use a liquid absorbing pad within the drawer.

Figure 20:
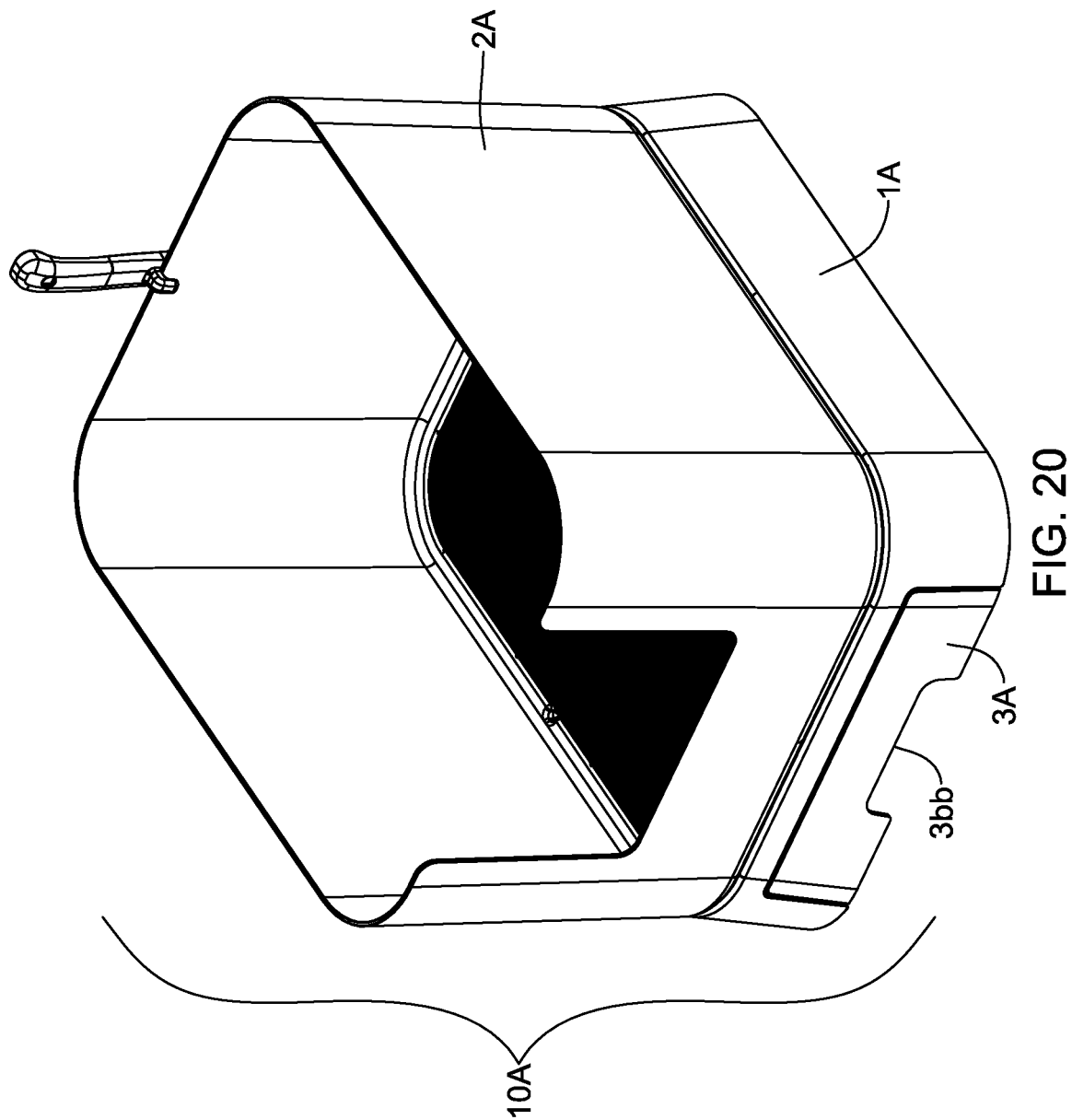
FIG. 20 is a perspective view of an alternative embodiment of an animal litter box incorporating the drawer of FIG. 18.
Figure 21:
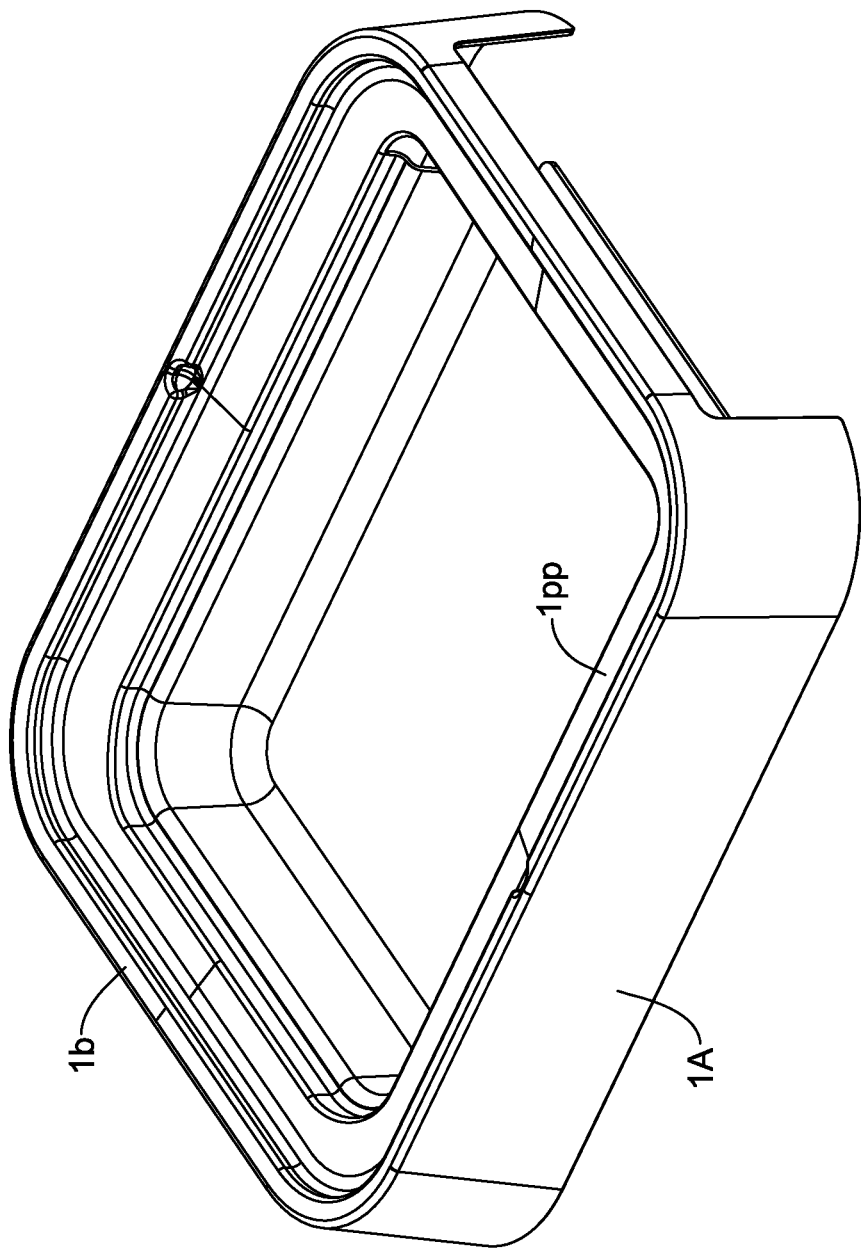
FIG. 21 is a perspective view of the base in the animal litter box of FIG. 20.
Figure 22:
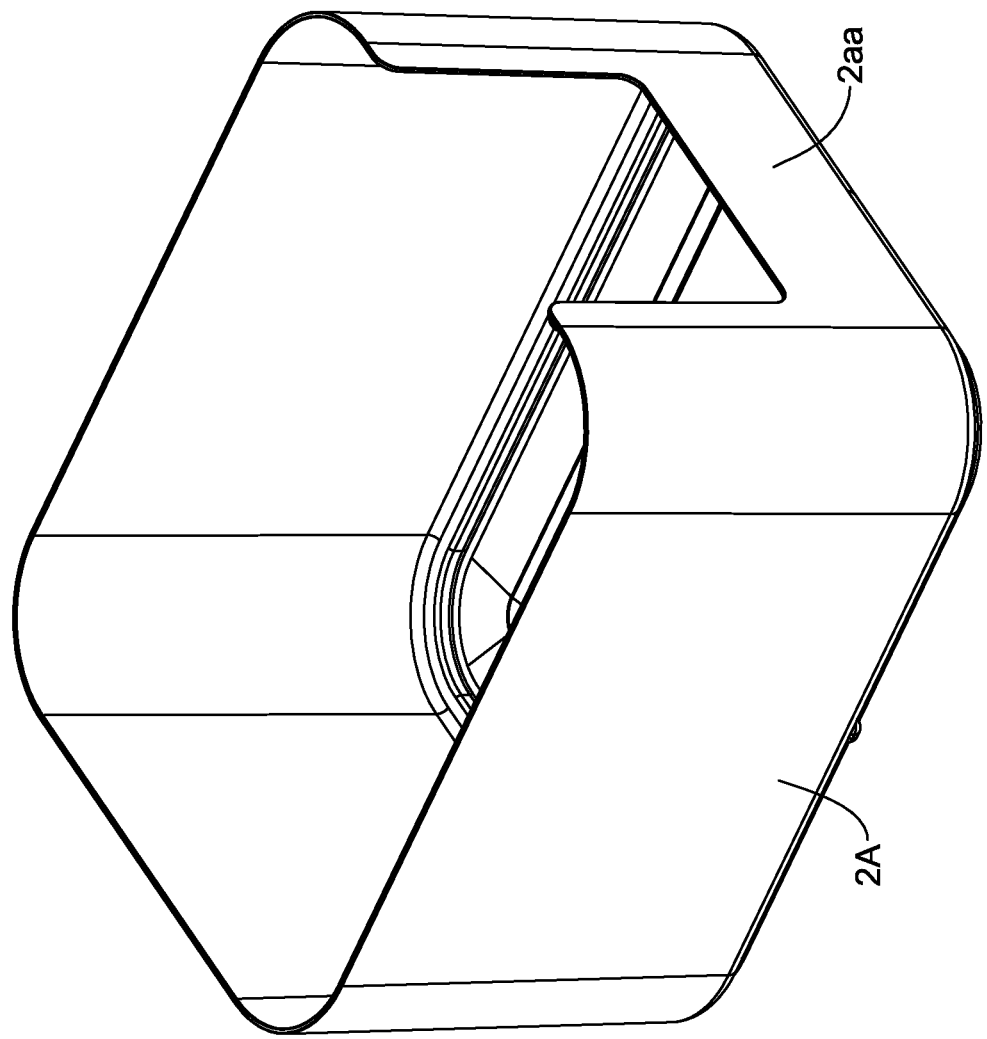
FIG. 22 is a perspective view of an alternative wall housing as included in FIG. 20.

FIGS. 20-22 depict an alternative embodiment of the above litter box having a different flange design but incorporating the same functional features. Drawer 3A is in the inserted or closed position and configured to have main components of base 1A, on the bottom with a 4-sided continuous flange to couple to the housing.

Base 1 is a rectangular shaped bottom part with continuous 3-sided base flange 1p to set the positioning of wall 2 and to guide drawer 3 to smoothly glide in and out of base 1 and to house drawer 3 when drawer 3 is in the inserted or closed position. As shown in FIGS. 3-6 the upper interior edge of the continuous 3 sided base flange 1p is retainment flange 1b, which along with first vertical flange 1c and top female fillet 1f, have shared surfaces with wall 2 external surface retainment flange 2cd, and sets the positioning of the wall 2 by trapping it on 3 sides, 1 transverse, and 2 longitudinal. Fillet if goes into the second horizontal flange 1d and a second vertical flange 1e moving downward at an angle of about 1°. At the external shared surface of the wall 2, both female fillets if and 1m are filleting at about 0.18 inches for the ease of cleaning with 1 fingertip. From the bottom female fillet 1m, a male fillet 1n is formed inward and downward approximately 0.25 inches to a shared surface with the drawer 3, the overrun flange 3e. This shared surface directs, controls, and prevents lateral motion of the drawer as it glides into the put-in position in the base 1, or for removal of the drawer 3 from the base 1 put-in position, preventing spillage of liquid waste within the drawer 3. The solid surface bottom 1a captures any liquid waste that may spill out of drawer preventing liquid waste from spilling on surfaces outside of the animal litter box 10.

Alternative embodiments of the above litter box system are depicted in FIGS. 18-22. The alternative system provides the same function as above but includes slightly modified components that assemble together. In particular, base 1A is a rectangular shaped bottom part with a continuous 4-sided base flange. The flange receives the housing walls 2A while the entire opening for drawer 3A is formed in the base rather than by part of the housing front wall. The upper interior edge of the continuous 4-sided base flange 1pp, is retainment flange 1bb, which have shared surfaces with wall 2A, external surface retainment flange 2cd, and set the positioning of the wall 2A by trapping it on four sides.

Figure 3:
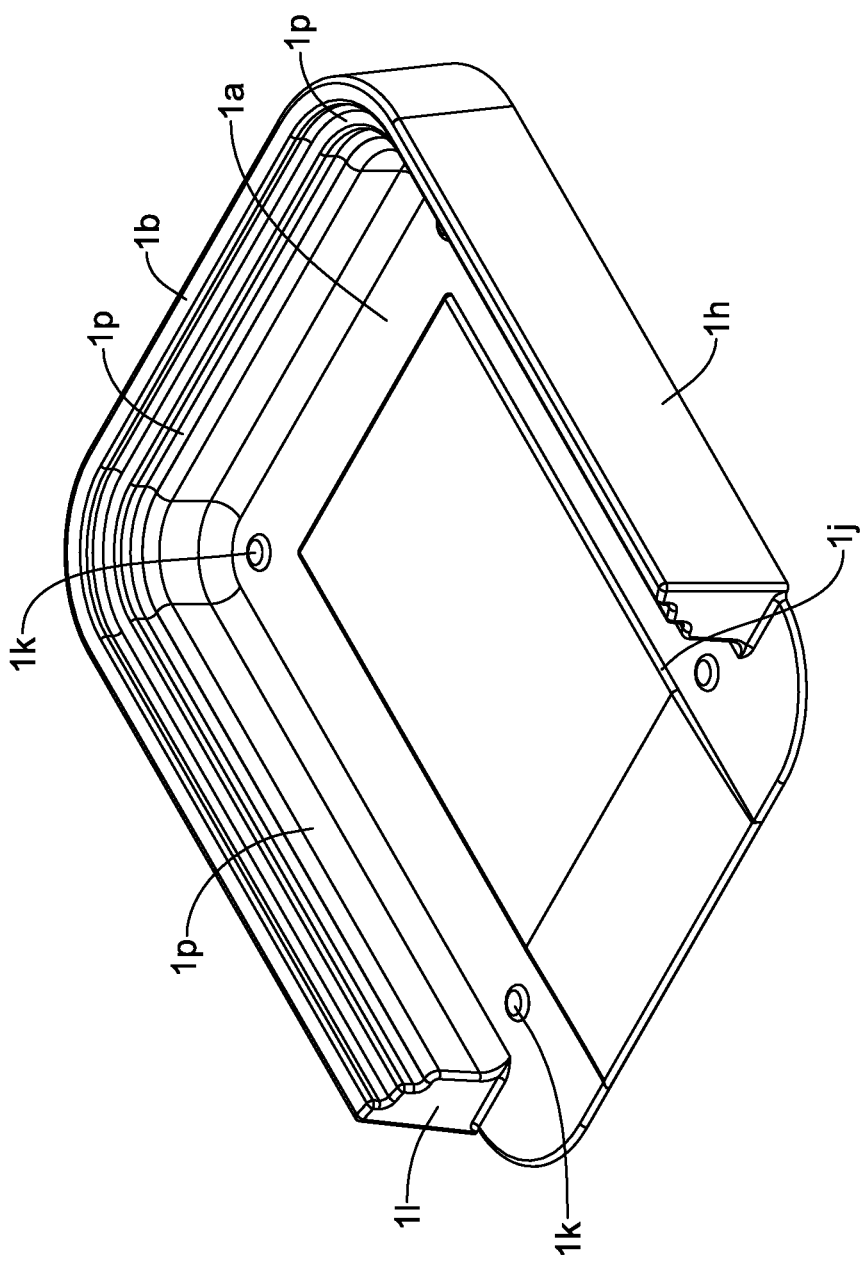
FIG. 3 is a perspective view of a base of animal litter box system according to one embodiment.
Figure 4:
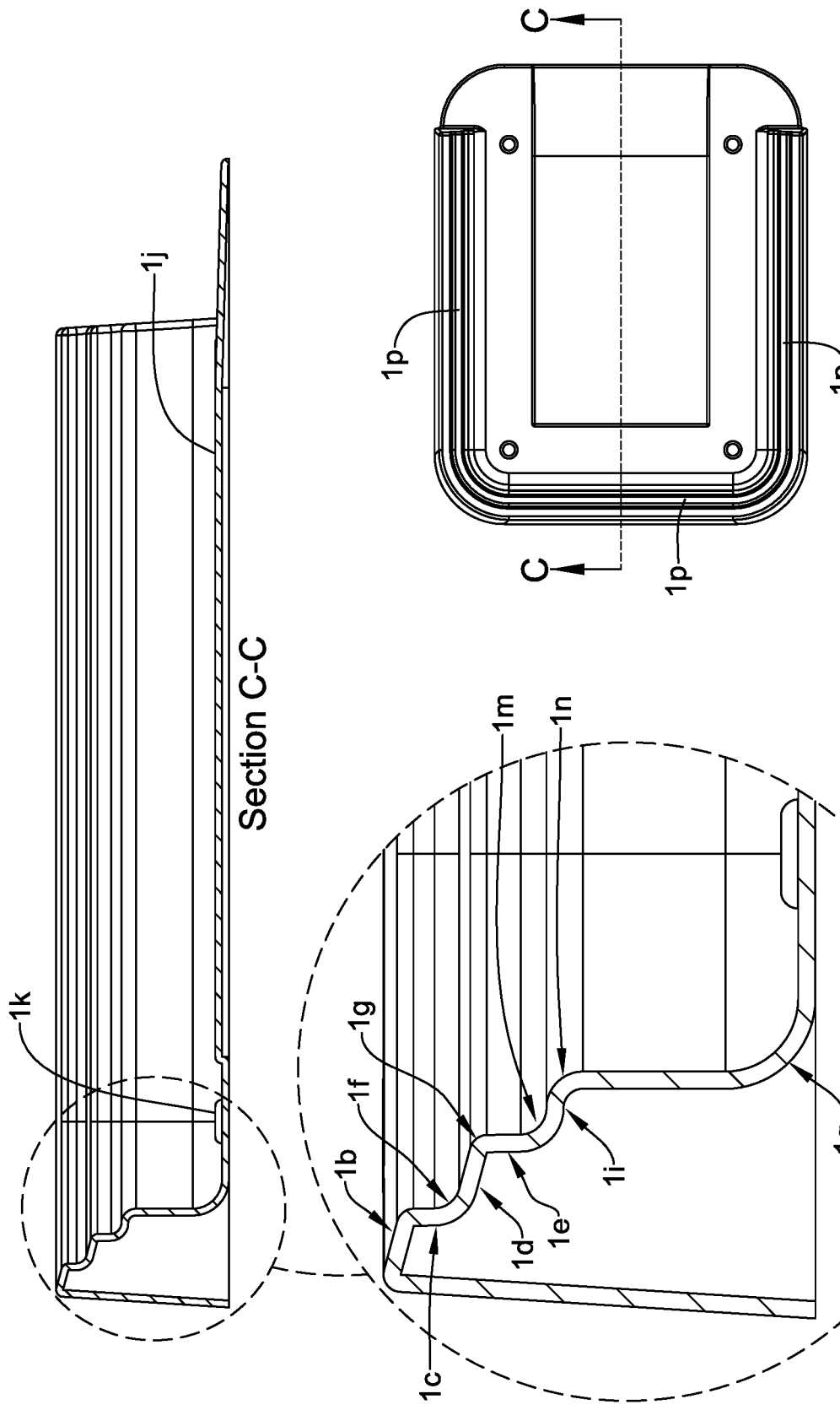
FIG. 4 is an enlarged cross-sectional view of a portion of the base of FIG. 3 along line C-C.

Shown in FIGS. 3 and 4, the base 1 has 5 bosses, which are slightly higher than the floor of the base 1a. The 4 circular boss's 1k, are for indexing and permanent placement of rubber bump-ons to prevent the animal litter box 10 from moving or scratching a surface it may be resting on. The 5th ramped boss 1j creates a large flat surface plane ramped for the drawer 3 to glide smoothly as moving into and out of base 1 put-in position, with the largest elevation toward the posterior wall of base, and gradually decreasing height as moving to the open side of base. The bosses 1k and 1j also create a gap above the drawer 3 as drawer is removed from base 1, preventing jamming between the drawer and the flange of the wall 2. An alternative embodiment may have some or none of the bosses on base 1 and/or 1A.

Shown in FIGS. 1, 2, 5, and 10, wall 2, and in FIGS. 20-22 as wall 2A, have a total of four side walls 2a and 2aa, with one of the side walls 2aa, which could be on short side wall as in preferred embodiment, or alternate embodiment cut-out could be on long side wall, with cut-out for animal entering and exiting animal litter box 10. Wall 2 has a series of flanges directed inward that externally nests with a fully enclosed continuous retainment flange 8 (see FIG. 11) made up of three sides of base 1 and one side of drawer 3 or alternatively made up of four sides of base 1A.

Figure 18:
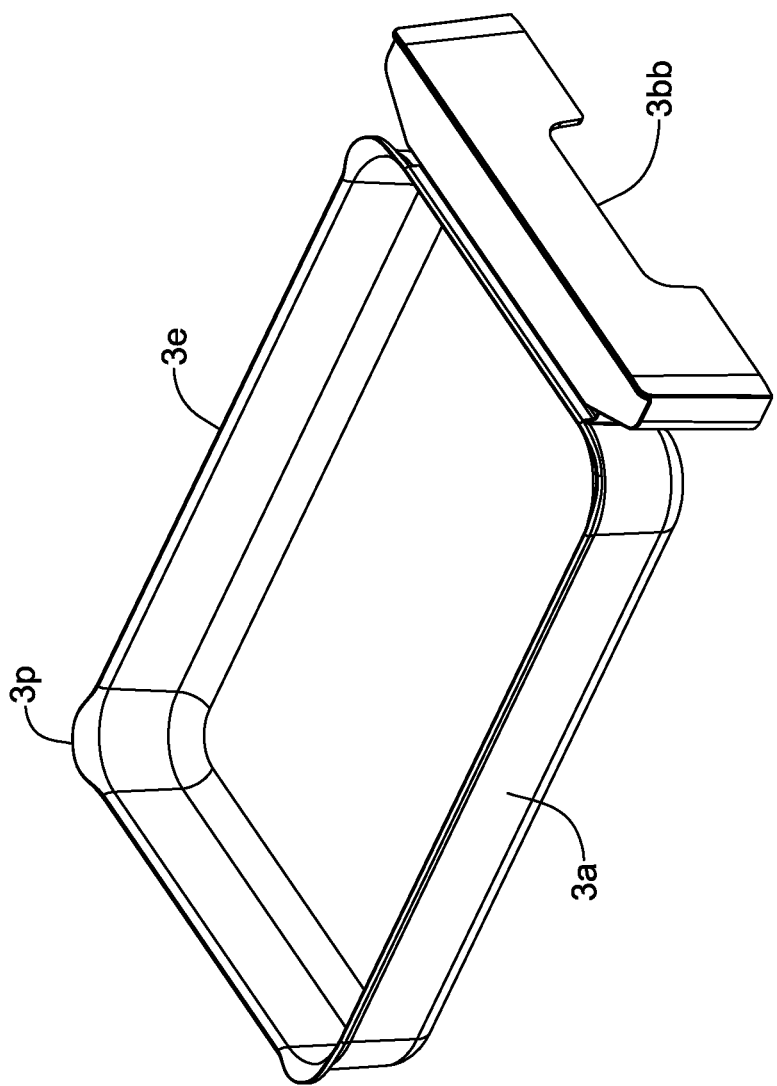
FIG. 18 is a perspective view of an alternative embodiment of a drawer of the present invention.
Figure 19:
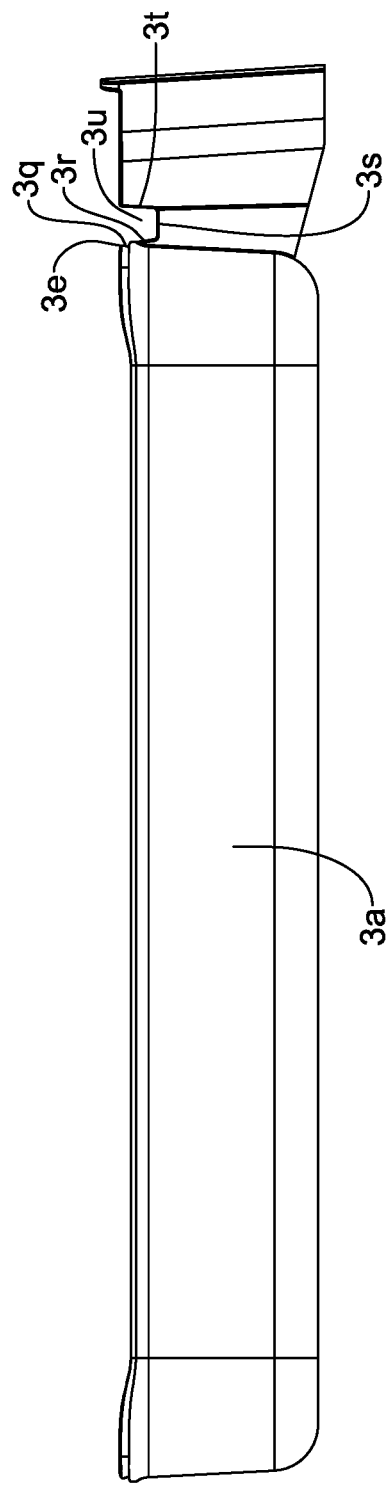
FIG. 19 is a side view of the alternative drawer of FIG. 18.

As shown in FIGS. 1-7, several embodiments show the drawer 3 opening and deboss drawer pull 3b and doorway opening 5 on a short side wall of animal litter box, but deboss drawer pull 3b and drawer opening and doorway opening 5 could also be located on a long side wall of animal litter box. Alternatively, FIGS. 18 and 19 show that drawer 3A can have a bottom deboss handle 3bb.

Figure 5:
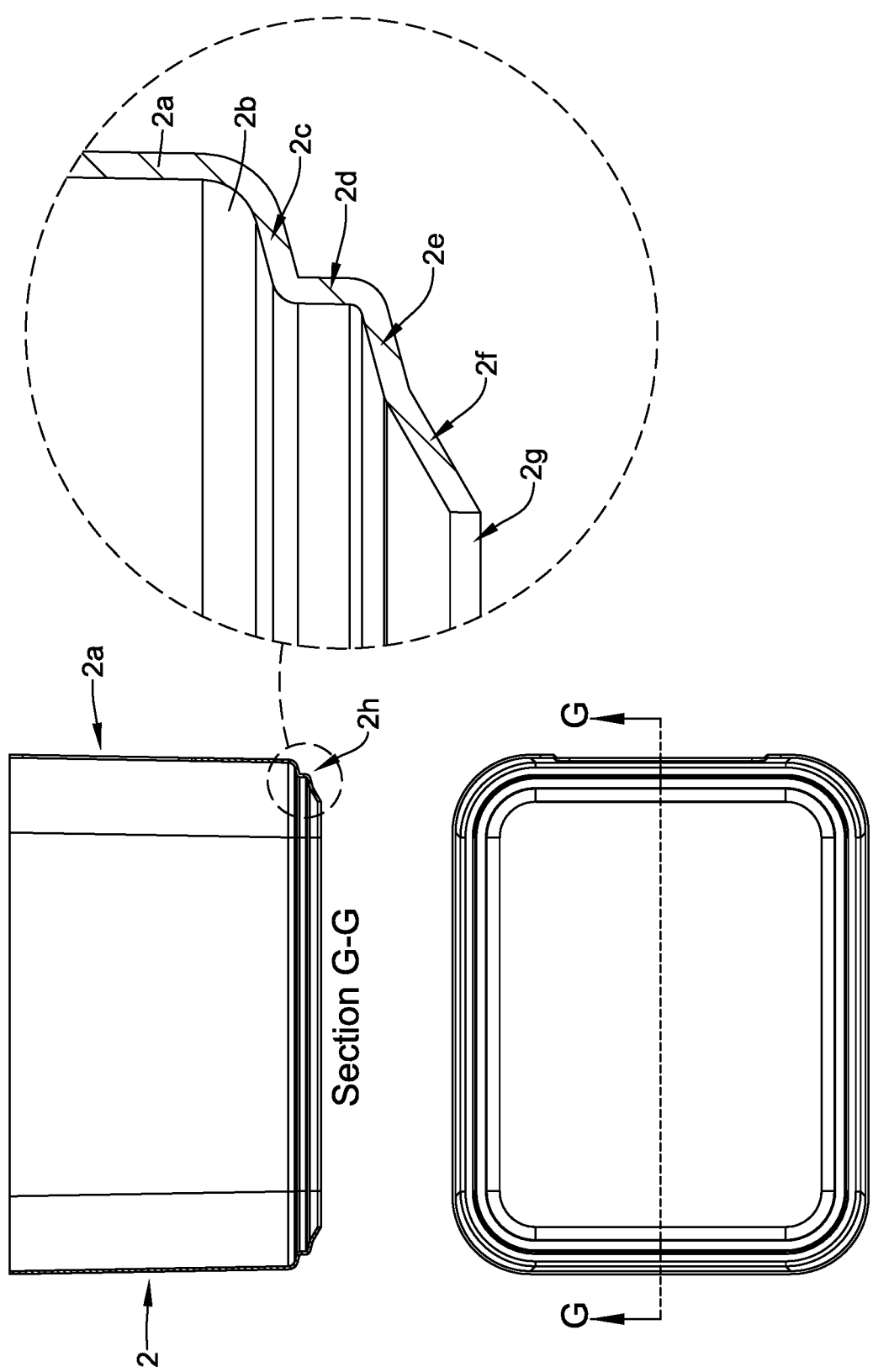
FIG. 5 is an enlarged cross-sectional view of a portion of the side walls along line G-G.
Figure 10:
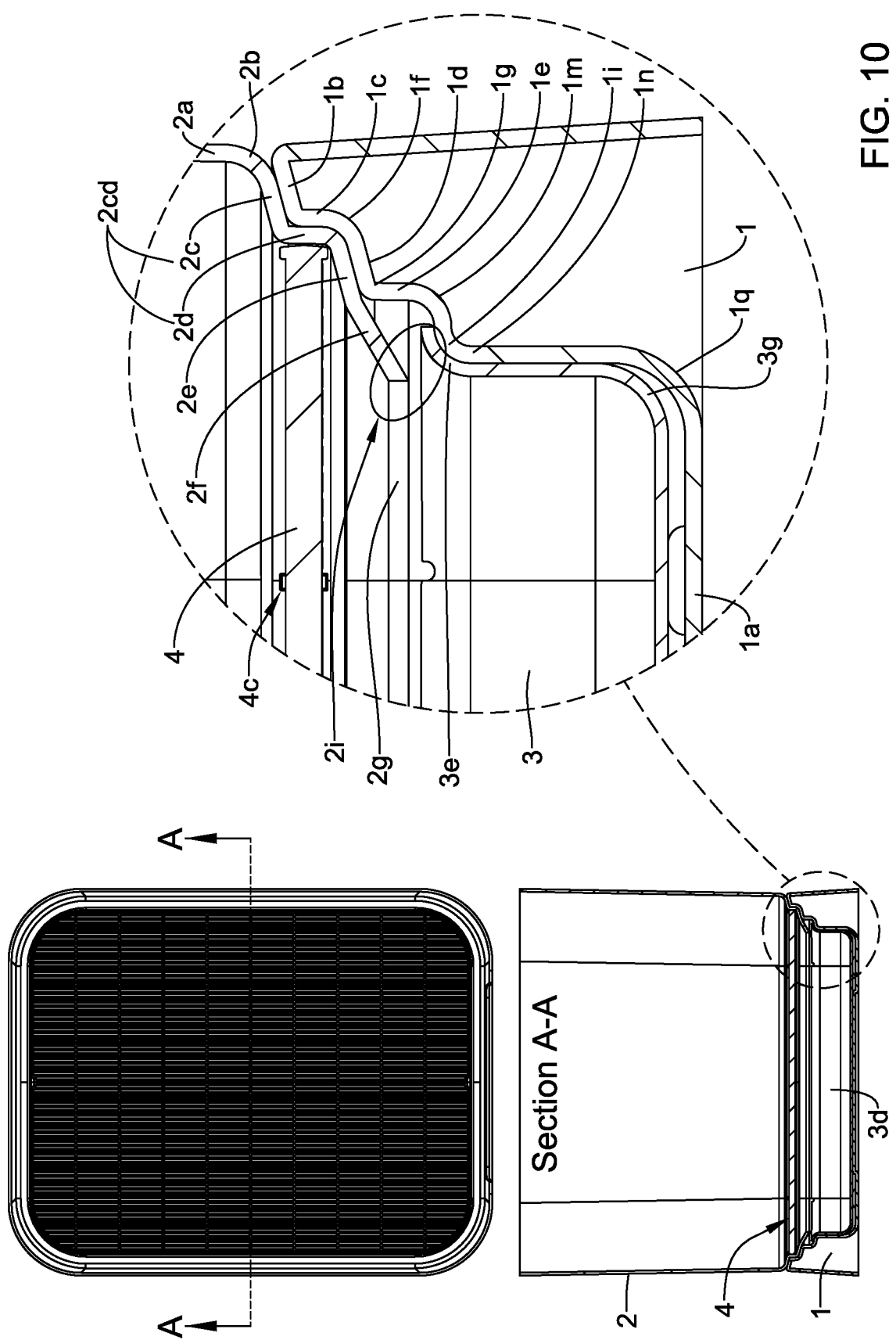
FIG. 10 is an enlarged cross-sectional view of a corner of the litter box system showing the assembled relationship of the base, the grate and the drawer along line A-A.

As shown in FIGS. 5 and 10, from the lower portion of wall 2 vertical side wall 2a, the first horizontal flange 2c moves inward (about 0.55 inches), and downward (about 0.15 inches) to form a 15° loft. The first horizontal flange 2c, then becomes vertical flange 2d, which extrudes downward about 0.25 inches at an angle of 1°. The external surface of these two flanges, first horizontal flange 2c and vertical flange 2d, form retainment flange 2cd, and have a shared surface with base 1 internal surface of base retainment flange 1b and first vertical flange 1c. On the edge of the intersection of vertical side wall 2a, and first horizontal flange 2c, is fillet 2b, sized appropriately at the chosen part material thickness such that the resulting interior fillet 2b is sized relatively close to 0.25 inches for the ease of cleaning with 1 finger. The interior function of retainment flange 2cd is to house and seat grate 4. From vertical flange 2d, second horizontal flange 2e goes inward at about 0.5 inches and downward at about 0.13 inches creating another 15° loft. The final horizontal flange 2f moves downward about 0.25 inches, 30° from the split plane and terminates at the intersection of final horizontal flange 2f with the interior wall of drawer 2i. The horizontal surfaces being drafted at or above 15° prevents puddling and then drying of liquid waste which prevents malodor. The increase of the final flange angle from 15 to 30° is to accelerate liquid waste flow toward drawer 2, to prevent the liquid waste from drying or adhering to the animal litter box 10. The trimmed edge 2g is cut in a direction perpendicular to the split plane to accelerate liquid waste flow preventing it from working its way back out of the drawer 2.

The surround walls of housing 2 or 2A, are seamless, so there is no leakage of liquid waste through a seam, and no cover required. Animals, such as male cats and dogs tend to urinate high and may urinate outside of a litter box if the litter box doesn't have high sides. As animals can urinate at multiple angles, urine can leak out through the seam between a cover and a side wall, or any sidewall seams.

Animal litter boxes 10 and 10A has no side wall seams and prevents liquid waste leakage outside of animal litter box 10 and 10A.

In some embodiments, the litter box includes a removable grate with divot cut-outs on short or long ends of the grate. In Matsuo U.S. Pat. Nos. 6,994,054 and 7,131,396, the bottom part of the litter drawer is detachable from the dripping container for cleaning purposes, but their design does not allow removal while the litter is still in the container, nor does it allow a means of directing of soiled litter into the reservoir drawer for easy removal of soiled litter. The present disclosed grate is removable, while litter is on the grate, by using the divot cut-out to lift with a finger, or to use litter scoop, and lifting as gliding the grate backwards, directing soiled litter into drawer. Further, the design allows the ability to change out the grate to allow different size grate openings, allowing various litter particulate sizes and to increase ease of cleaning the box. The varying styles of grates improves the versatility of the system. Many animals will accept a pellet litter, but others have more sensitive paws, and require a softer and smaller particulate size.

Figure 8:
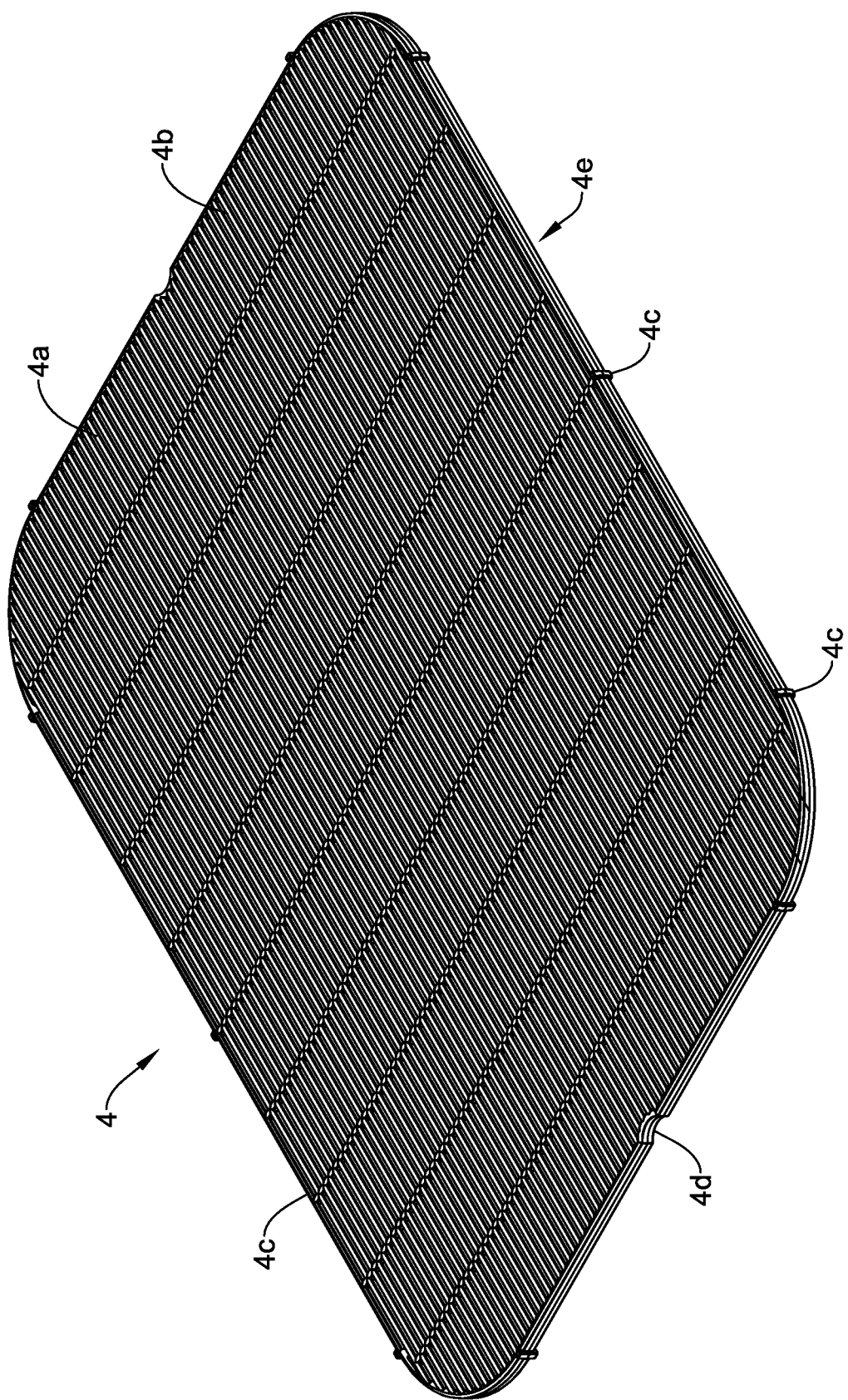
Figure 9A:
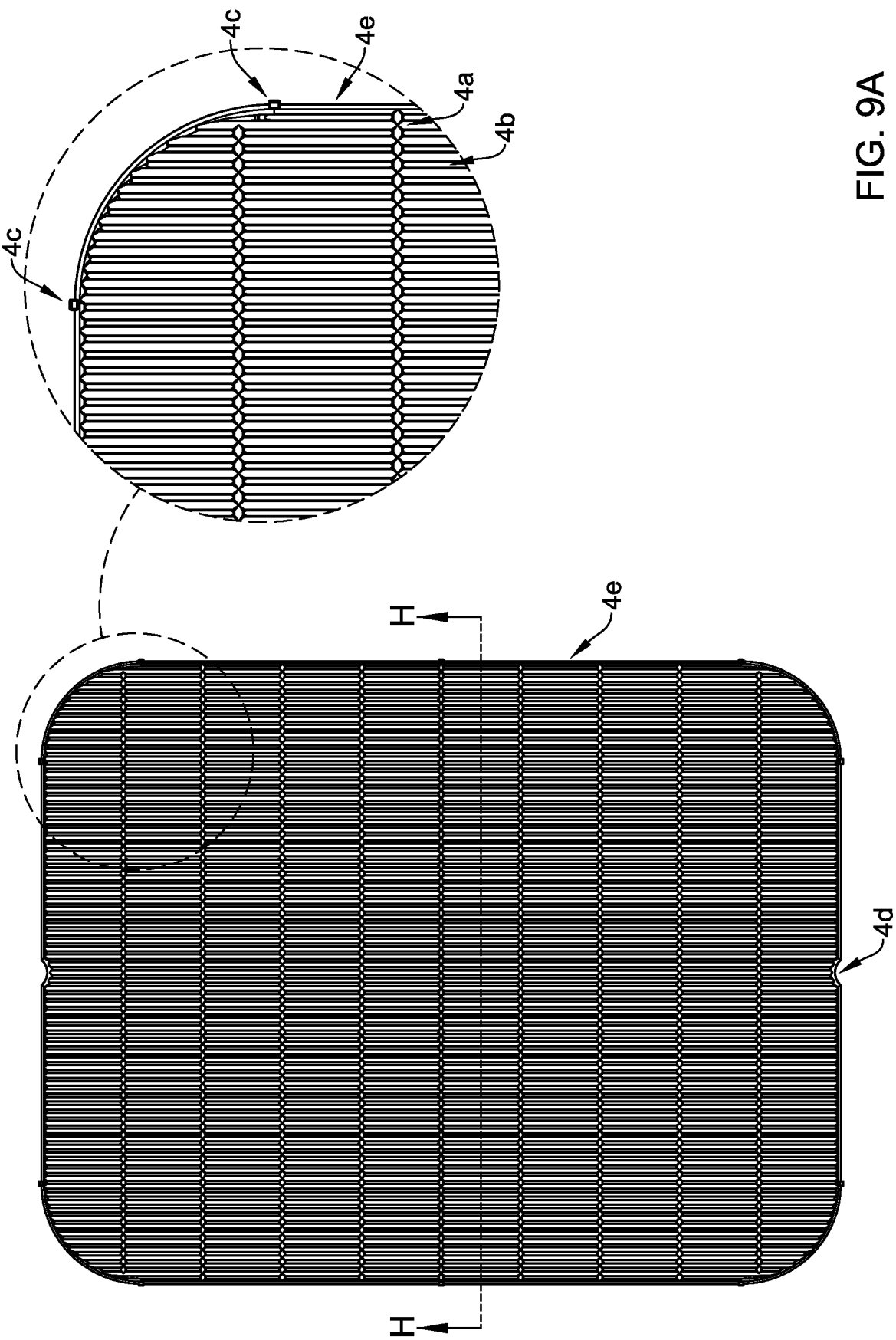
FIG. 9A is an enlarged view of the surface of the grate of FIG. 8.

As shown in FIGS. 1, 8, and 10, the grate is a rigid and strong liquid permeable removable grate 4 with a plurality of openings to maximize the passage of liquid waste, while preventing the passage of litter. The grate 4 spans the entire transverse width and longitudinal length of the inside of the wall 2 vertical side walls 2a and 2aa, creating a large surface/footprint area for the animal to move around in within the litter box 10. The grate 4 openings need to have enough open area to facilitate the passing of liquid waste through them, and enough strength to prevent deformation of the grate bars 4b due to the weight of the animal and the litter particulate. To maximize the pass through of liquid waste, the grate 4 has a 25-75% open area, preferably 45-60%, strong enough to support the weight of at minimum of 20 pounds, more preferably 25-30 pounds; the weight of the litter plus the weight of an animal.

Grate deformation causes litter particulate to get caught in between the grate bars 4b and could create deformation movement which is startling to an animal and could dissuade an animal from using the animal litter box 10 or 10A. A strong grate 4 material, such as an ABS plastic or stainless steel, but not limited to these materials, is preferred, to prevent deformation. Grate 4 rounded bars 4b on top and bottom surfaces facilitates a hydrophobicity by having curves and no flat surfaces, to maximize liquid waste pass through.

All grate surfaces that may be contacted by animal urine are smooth and rounded to maximize liquid waste flow from the top of the grate, over the rounded bars 4b, through the liquid permeable open spaces, to flow to the bottom side of the grate 4 and then to flow away from the bottom side of the grate bar 4b creating a stream of liquid encouraging flow, and avoiding droplets which splatter. The rounded surfaces of the grate bars 4b also create a mildly uneven upper surface so litter particulate is uneven, which creates space between litter particulate, facilitating quick and efficient movement of fluid through litter particulate, through the top side of grate through to the bottom side of grate 4 to drawer 3 or 3A. Projections 4c on outside edge 4e of grate 4, prevent translational or longitudinal movement of ramp when ramp is set in wall retainment flange 2cd, while also creating a small space between the wall retainment flange 2cd and the outside edge 4f of the grate 4. The projections 4c also extend slightly superiorly and inferiorly beyond the height of the edge on both the top and bottom sides of the edge, creating a load onto the projections 4c and slightly elevating grate 4, creating a space between the bottom of the edge 4f creating a pathway for any liquid to flow from the side wall 2a, fillet 2b, first horizontal flange 2c, wall retainment flange 2cd, vertical flange 2d, second horizontal flange 2e, final horizontal flange 2f, over the trimmed edge 2g, and into the drawer 4. An alternative embodiment for the grate is a mildly textured grate with subtle bumps and valleys, or a woven wire mesh that angles inferiorly to the lowest (valley) area. Liquid, such as urine from an animal, is excreted onto the litter particulate 12a (see FIG. 12), passes through the litter particulate 12a, the grate 4 and into the drawer 3 or 3A, which may or may not use an absorbent pad within the drawer.

In at least some preferred embodiments the drawer is a deep reservoir with a top rolled edged that can hold all the litter when it is desired to empty the litter from the box by removing the grate. The deep reservoir drawer with top edge rolled outward and enlarged in the corners 3p in FIG. 18, allows easy pouring out of captured liquid excrement. When using without a pad, the box is designed to allow easy removal of the reservoir drawer, carrying the drawer with urine to dispose of liquid waste without spilling, and easy pouring into a toilet. This also allows ease of accessing animal urine for health testing of the animal. It is possible to measure total urine output and allow easy use of the urine for urinalysis for diagnosing disease, or for screening for health problems. The pads offer convenience and reduce odor and are utilized in preferred embodiments. The drawer gives the consumer the option to use a pad or not use a pad, or to easily alternate. The catch basin/liquid reservoir drawer has a larger volume than previous litter boxes, and can hold 6-9 cups of liquid, or 12+ cups of litter allowing less frequent emptying, and less maintenance. Further, less pads are needed if they are large capacity pads. If a person chooses to use the pad, the pad will capture, retain the urine, and neutralize the odor.

Figure 6:
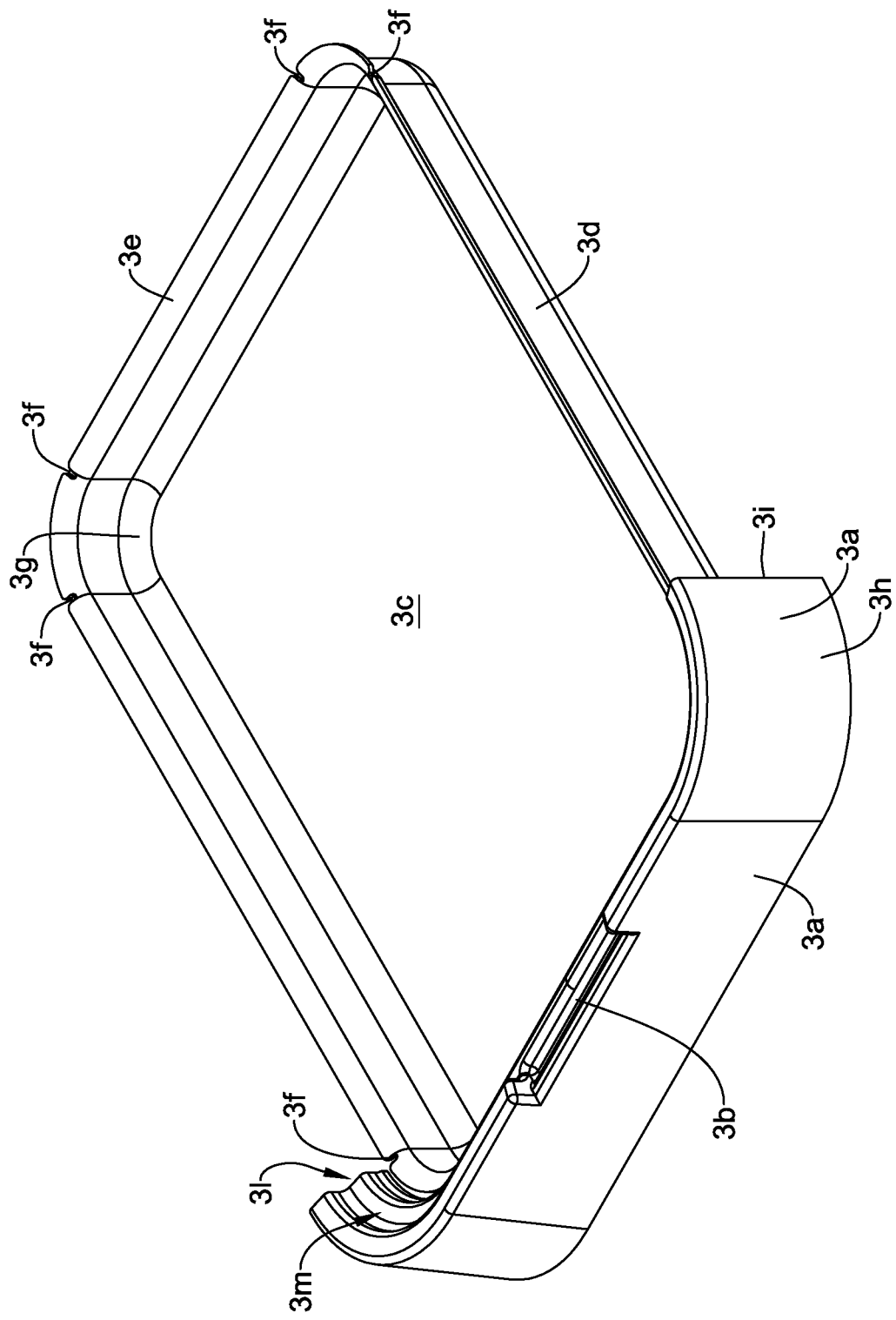
FIG. 6 is a perspective view of one embodiment of a drawer of the present invention.
Figure 7:
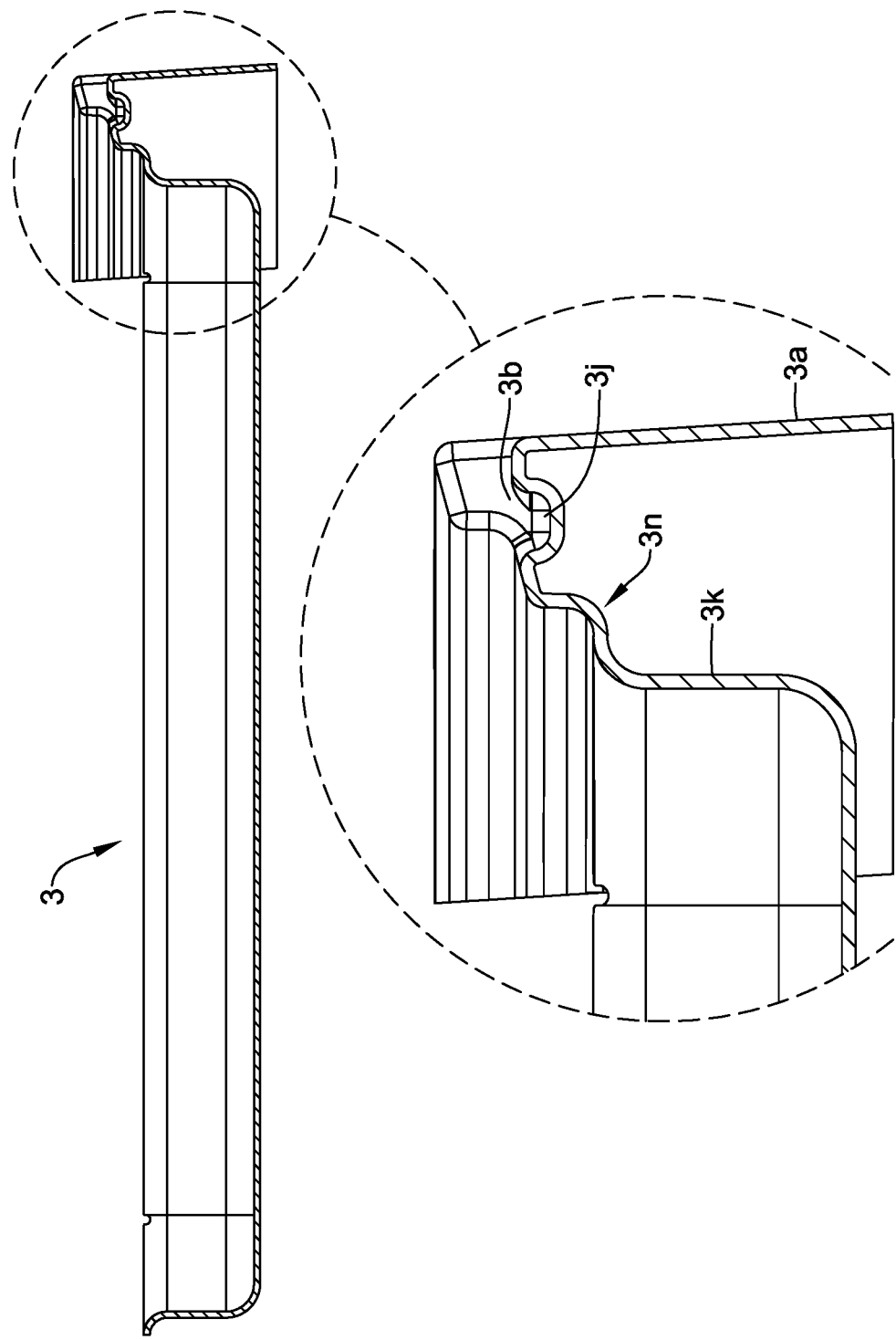
FIG. 7 is an enlarged cross-sectional view of the drawer of FIG. 6 showing the longitudinal cross section.

As shown in FIGS. 1, 2 & 6, the removable drawer 3, receives and holds the liquid waste that has been excreted from an animal. The drawer has a bottom 3c, which at each side wall creates a 0.4-inch fillet 3g, intended for easy cleaning. This fillet 3g connects into the 4 vertical side walls 3d, and moving upward at the top edge, forms into the over-run flange 3e. The 2 longer sidewalls run longitudinal and are opposite from each other. The 2 shorter side walls run transverse and are across from each other.

In drawer 3, the front over-run flange 3e then connects into the front interior flange 3n. The interior flange connects into the continuous exterior surface of the drawer 3a. A plane, perpendicular to the floor, parallel with the transverse width of the animal litter box 10, and coincident at the intersection of the large exterior fillets 3h and the flat edge running the depth, creates the joint between the interior flange edge 3l and the exterior edge 3i surface, and the flat flange surface 11, the intersection of drawer exterior edge and base flat flange surface 6, in FIG. 1. This creates a clean aesthetic and functional transition between two separate components of the animal litter box 10.

In the alternative, drawer 3A of FIGS. 18 and 19, the front over-run flange 3e then forms an outer small male fillet 3q, and then extends vertically downward 3r, to a horizontal connection 3s, into the vertical 3t drawer handle 3bb. The space 3u, creates a retainment area for the outer edge of the absorbable pad for all four sides of the drawer over-run flanges 3e. When the drawer 3A is in the inserted or closed position of the base 1A, a joint is created along the horizontal top edge of the handle 3v, the two vertical sidewalls 3w of the handle, and the base interior opening edges, creating a clean aesthetic and functional transition between the two separate components of the animal litter box 10A.

Figure 11:
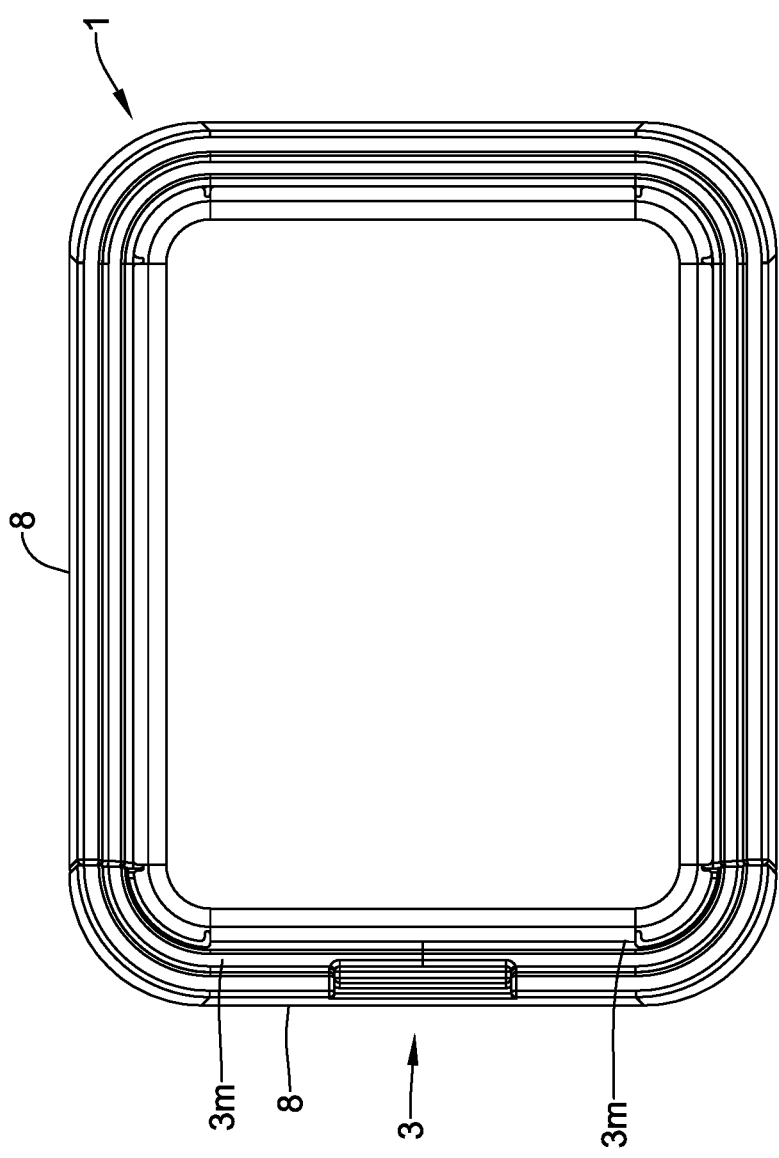
FIG. 11 is plan view depicting a continuous base and drawer enclosed by a retainment flange.
Figure 12A:
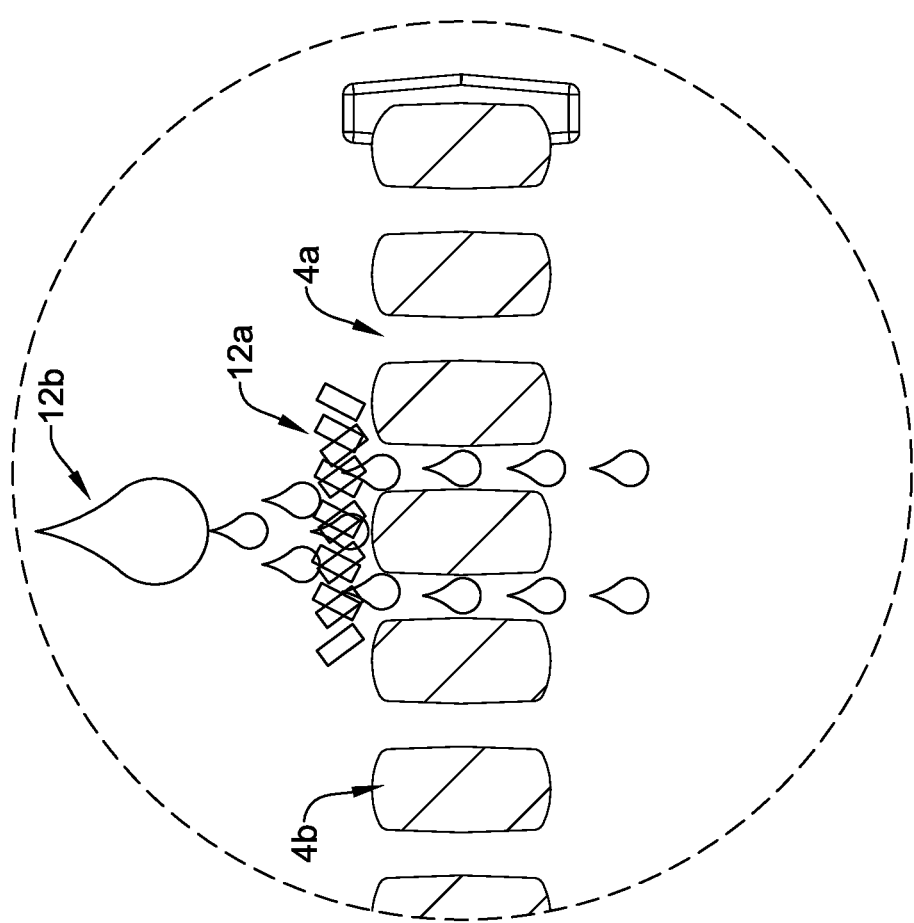
FIGS. 12A and B are an enlarged cross-section view depicting urine flowing through animal litter pellets and a grate.
Figure 12B:
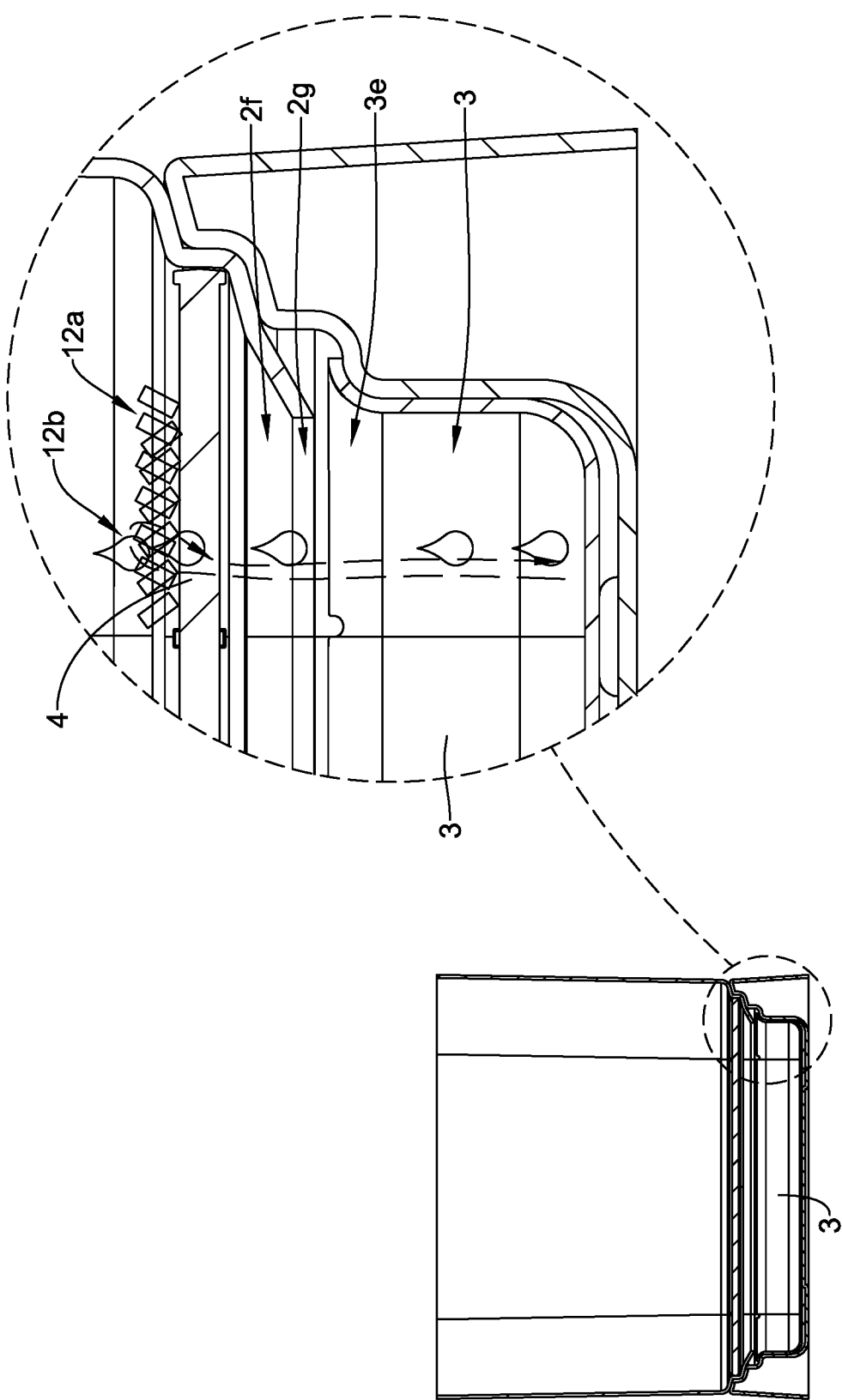

FIG. 11 shows the totally enclosed retainment flange 8, created by combining the base 1 and the drawer 3 when the drawer is in the fully closed or put-in position. FIGS. 2, 5, and 11 demonstrate how this retainment flange creates a seating for wall 2 external flange 2h.

In animal litter box 10, there are eight total cuts, called cinch notches 3f; two in each of the four corners of the drawer. These cinch notches 3f allow the absorbent pad 13a to attach to the drawer 3, so the pad remains in position and does not get caught up when moving the drawer in or out of the put-in position or totally closed position.

A preferred embodiment is for the drawer to house an absorbent pad 13a to capture and hold onto the liquid waste and to neutralize odors. An absorbable pad made to lay flat on the bottom of a reservoir drawer, to go up the sides of the reservoir drawer, and to bend outward over the over-run edges 3n of the reservoir drawer. The outer non-absorbent edges may have perforated handle "C" cut outs. An alternative embodiment is a drawstring in the outer peripheral border of non-absorbing portion of pad that runs through a channel made from the bottom impermeable layer by folding over and sealing. The drawstring lays flat within the channel until ready to be pulled out and cinched. The drawstring is made of similar bottom impermeable material. There are two exits for the drawstring from the channel, directly across from each other, preferably front and back, but could be side and side. Once the pad is saturated, the border is lifted over the edge, and the drawstring is pulled from the two exit areas as lifting and cinching, keeping all the urine and saturated pad contents locked in, allowing easy, clean disposal without spilling, or touching the saturated areas. It can then be carried to composter or garbage. An alternative to the drawstring is: two-four handled perforated cut out handle areas, ideally one for each side of the outer impermeable layer but could be two opposite sides. An option proximal to the cut-out handle, on the back/outside of impermeable layer, would be an attachment of impermeable plastic, attached in the middle to the impermeable layer, and shaped as width and length allowing to tie around the four pad edges where the perforated handles are brought together. This again would prevent touching of the soiled portions of the pad, and prevent any spillage of contents, and allow easy transport to dispose of pad. Another embodiment of the absorbent pad would have C-shaped perforations in the corners of the outer non-absorbing portions of the pad edges extending in the corners from the outer perimenter of the pad to engage the drawer retainment flange 3m or the enlarged over-run edge corners 3p of the drawer 3A of the animal litter box 10 or 10A, or alternatively, a taut stretchy outer perimeter of the non-absorbing outer edge of the pad to go over the upper angled over-run edges 3e of the collection drawer, to hold the absorbable pad in position while moving the drawer in or out of the base.

In preferred embodiments, the absorbable pad has multiple layers. The top layer is a liquid permeable sheet, preferably made from bamboo or a wood fiber; the bottom layer is liquid impermeable and made of a plant-based bioplastic that is biodegradable or compostable such as polylactic acid. Between is an absorbent non-woven fluff layer, preferable bamboo or wood fiber, a biodegradable super absorbent polymer (SAP), starch-based SAP that is biodegradable or preferably a compostable SAP. Alternative embodiments include a hydrophilic clumpable cat litter substrate to assist with absorption, retainment of liquid, and neutralization of urine for odor control. There may be a biodegradable substance added for management of odor, or odor neutralization.

The absorbable portion is sized to fit in bottom of drawer, and top permeable and bottom non-permeable layer to continue up the vertical side walls. In each corner there can be two cinch notches for the corner of the permeable/non-permeable portion of the pad to pinch into. Removing the grate with the soiled litter in the litter tray and having the bottom edge of base to direct the litter particulate, allows litter to passively drop into reservoir drawer, making changing litter quick, easy and hygienic, significantly reducing required maintenance. No need to take the whole system apart to clean the box; just empty used litter into reservoir drawer, spray & wipe smooth inner walls and grate with wipeable cleaner, replace grate, replace clean reservoir drawer, and add fresh litter. The reservoir drawer with soiled litter can easily be emptied into a bag or container to be disposed of, or easily be carried to an area to dispose of or be composted. All the cleaning can take place without having to move a dirty litter container with holes or hauling whole system to a cleaning area. Our litter drawer is deep with higher sides, and large bottom surface, allowing the dirty litter to stay in the tray to be easily carried with clean outer surface, and to contain dirty litter, and dispose with ease. Litter drawer is much smaller, lighter and easier to carry than the whole litter container.

When using absorbent pad, the absorbent portion of the pad fits on the inside bottom of the reservoir container. The non-absorbent bottom layer and top layer combine and continue outward beyond the absorbent layer, and angles upward along the reservoir drawer walls, and goes up and over horizontal top edge. In a preferred embodiment the non-absorbent edge continues up all four side walls and has tabs 13e that slide into each cinch notch—2 at each corner, to hold onto pad edge. This edge may or may not have a drawstring/cinch to facilitate removal in a clean and easy way, or may have "C" shaped tabs in each corner. Undo tabs from cinch notch areas in each corner and simply lift each corner of pad edge. If it has a drawstring, each corner drawstring will be pulled, tightening up the whole pad, with all the absorbent portion of pad with liquid contents, locked into a bag made with pad. Another option is to have "C" shaped perforations in the sides of the non-absorbent portion of pad, and use those to lift pad, again keeping absorbent portion of pad contained inside to prevent leaking and to prevent touching the liquid waste. In one embodiment, the pads edge goes laterally over the tray lateral edge and then inferiorly and to follow outside wall. In another embodiment, the widened edge goes over the tray edge, and contains a drawstring or cinch, within a tunnel made by folding over the bottom impermeable edge of the absorbent pad outward and sealing. This prevents the non-absorbent edge, or flaps, of the pad from getting caught and curling up, on the bottom of the lower edge of the side wall as it is being pushed back into the base. Another preferred embodiment of the absorbable pads outer non-absorbent edge would have C-shaped perforations in the corners of the outer non-absorbing portions of the pad extending in the corners from the outer perimeter of the pad to engage the drawer retainment flange 3m or the enlarged over-run edge corners 3p of the drawer 3A of the animal litter box 10 or 10A. Alternatively, the pad could have a taut stretchy outer perimeter of the non-absorbing outer edge of the pad to go over the upper over-run edges 3e of the collection drawer to hold the abosorbable pad in position while moving the drawer in or out of the base.

Figure 13:
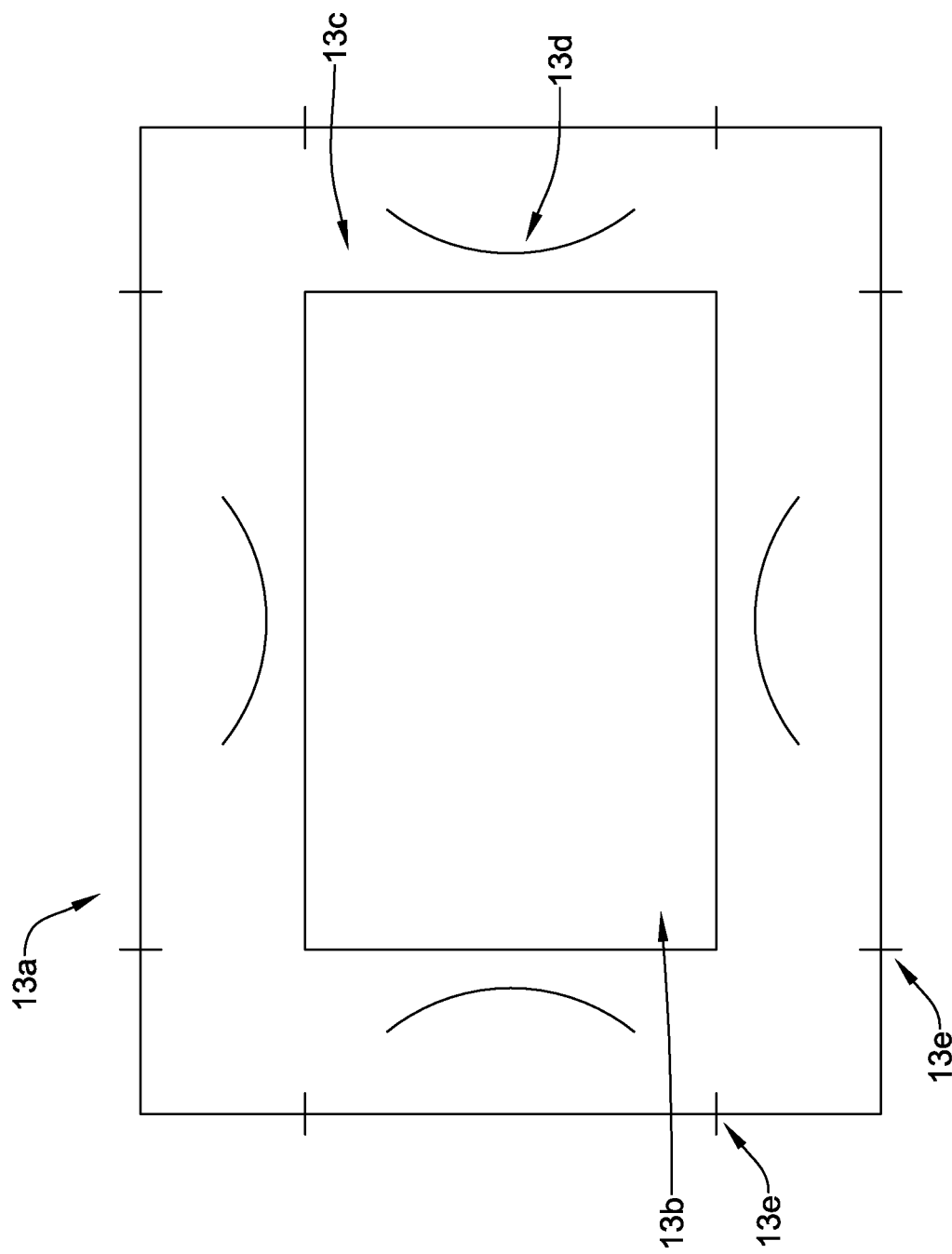
FIG. 13 is a plan view of one embodiment of an absorbent pad.

FIG. 13 depicts the absorbent pad 13a that may be used to capture liquid waste in the drawer 3. The absorbent pad 13a is made with all bio-based components and is therefore biodegradable. 13b is the absorbent portion of the pad and 13c is the non-absorbent portion where the perforated handles 13d are located. Tab 13e is the location that the non-absorbent portion of the pad that fits into on the cinch notches 3e on the drawer 3. These cinch notches 3e hold the pad down and make it tight so that it doesn't get caught up as the drawer 3 moves in and out.

Figure 15:
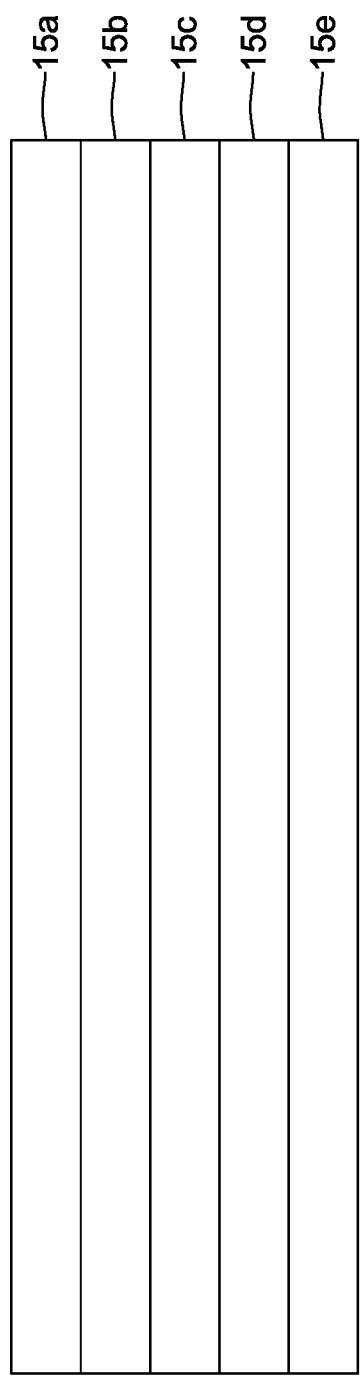
FIG. 15 is a side view of an absorbent pad depicting multiple functional layers.

FIG. 15 shows the layers of the absorbable portion of the absorbent pad 13a. The top layer is a liquid permeable top sheet that is hydrophilic and pulls the liquid in and disperses the liquid waste. The second layer is fluff or wood pulp, or bamboo fluff or nesting material that is also hydrophilic and pulls the liquid waste in. Next is a biodegradable starch-based super absorbent polymer material (SAP) that is environmentally friendly. The 4th layer is another non-woven permeable layer that disperses the liquid so that as much of the liquid waste as possible contacts the biodegradable SAP. The bottom layer is a bioplastic impermeable membrane material. This prevents animal liquid waste from leaking out of the pad. All the components are biodegradable, and environmentally safe for the planet.

Another possible component to add into the absorbable pad is a bio-based odor neutralizer such as Itaconix® ZINADOR™ 22L, which is a polymeric zinc itaconate complex that is 100% bio-based. It is also possible to add additional ingredients to the absorbent pad, including changing order of layers and numbers of layers.

The absorbent portion 13b of the pad is in the center rectangle see FIG. 13. The non-absorbent border 13c is a continuation of the top sheet 15a and the bottom sheet 15e. In a preferred embodiment, the absorbent portion 13b lays on the floor of the drawer FIG. 6, 3c, and the non-absorbent border 13c rests against the inner side walls of the drawer. The drawer has two cinch notches 3f in each of the 4 corners, for the non-absorbent corner tabs 13e of the pad to push into and tighten the pad down. This directs the edge of the nonabsorbent portion over the over-run flange 3e to keep the nonabsorbent portion 13c tight against the drawer side wall 3d and over-run flange edge 3e, preventing the side walls from falling inward away from the side wall 3d, and preventing liquid waste from getting behind and underneath the bottom layer of the absorbable pad 13a. On each of the four non-absorbent borders is a perforated 13d area that becomes a handle. This becomes a handle when removing the soiled and saturated pad from the drawer.

Figure 14:
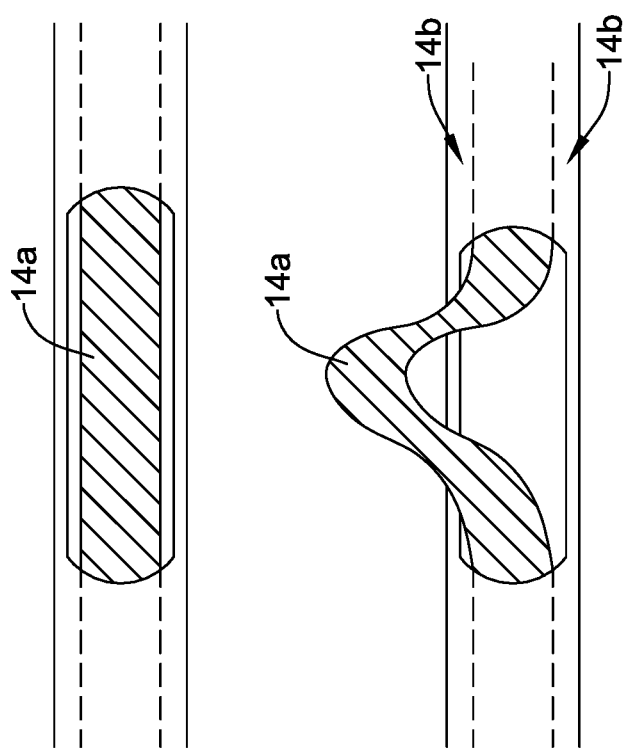
FIG. 14 is an enlarged view of a drawstring through non-absorbent edge of an absorbent pad.

In a second preferred embodiment, the non-absorbent portion of the absorbent pad 13a, continues out over the drawer over-run flange 3e, and contains a drawstring or cinch see FIG. 14, 14a, within a tunnel made by folding over the 14b bottom impermeable edge of the absorbent pad outward and sealing the edge. The cinch notches 3f would again be used as in first preferred embodiment. In removing the soiled and saturated absorbent pad from the drawer, remove the cinched non-absorbent pad tabs 13e first, and then as in FIG. 14, lift each of the four drawstrings 14a and 14b on each of the four sides of the non-absorbent pad 13c areas in a similar location as the perforated handles 13d. Lifting the four drawstrings 14a and 14b, tightens up the whole absorbent pad 13a, keeping all of the soiled and saturated contents locked in. This makes clean, easy, and sanitary removal of all liquid waste, reducing the maintenance and mess with what can be an unpleasant task. The alternative designs for the pad also provide this benefit.

Because the soiled absorbent pad contains all biodegradable components, urine and pad materials, this pad can be put into a compost bin. Using bio-based materials decreases the environmental impact from a materials side to the end disposal side.

Use of the absorbent pad 13a significantly reduces the maintenance required in keeping an animal litter box clean. The pad 13a captures and holds onto the liquid waste and can decrease the frequency of having to remove the liquid waste, whether through a clumpable litter, or through use with animal litter box 10 or 10A, without using the absorbent pad 13a. The absorbent pad 13a as described above should last up to 5-9 days for one cat, of average weight of 9-10 pounds, which produces an average of ½ cup of urine daily. The absorbent pad 13a holds onto the urine and neutralizes the odor, preventing malodorous odors from being released into the air. The liquid absorbent sheet 13a allows less maintenance with decrease changing of the pad to every 5-9 days for one animal, clean and easy removal and disposal of pad.

The present invention comprises a lightweight ramp with outer base tray and inner ramp insert that attaches to most styles of litter boxes, that cleans animal's paws, that captures litter tracked outside a litter box, that facilitates entering and exiting the litter box for all animals, allows cat scratching on the insert, is easy to use, has a low cost, and keeps animals' preferences in mind.

As shown in the drawings, the present invention comprises a ramp assembly that can include a lightweight bottom base ramp tray with side rails and a back rail, and may have a front flap (if made out of corrugated cardboard), or with an inferior angled projection flap if made of a solid material, that attaches to most styles of litter boxes which would go over the front edge of a litter box, which captures and holds the litter, along with a lightweight rigid insert ramp, which loosens and cleans the animals paws as it walks down the ramp on exiting. The top insert ramp may end prior to the bottom base ramp tray, or can have a tapered end creating a holding area for captured loosened and tracked litter, until ready to put back into the litter box 10 or 10A. The base ramp tray and inner ramp nest and attach to the edge of an animal litter box, to facilitate the ingress and egress from the box for animals of all ages and abilities, including kittens, senior cats, and cats with mobility problems. The ramp is easy for cats, animals and their owners to use, easy to clean, easy to capture and return loose litter back into the box, is low cost, and keeps animal preferences in mind. To return the litter to the litter box, you just lift and pour it back into the litter box.

One preferred embodiment would include the base tray of corrugated cardboard, which could be sprayed with a wax to add liquid resistance, with the front flap adjustable to the varied inside edge of a litter box. By being approximately 3 inches, the lower tray flap is held in place by the upper insert rigid ramp. The upper insert ramp could be corrugated cardboard and nest with the tray. The base tray ramp could also be made from a material such as, but not limited to: wood, bamboo, or plywood, and a top walking surface with a material such as, but not limited to corrugated cardboard, sisal, seagrass, hemp, or jute.

Another preferred embodiment would include the base tray made out of a solid material such as, but not limited to wood, bamboo, compressed paper, plastic or plywood, and bent to an angle of 90 to 125° or in one embodiment approximately a 115° angle, and the nesting ramp made out of corrugated cardboard or a material such as, but not limited to wood, bamboo, plastic or plywood with a top walking surface such as, but not limited to sisal, seagrass, hemp, or jute. If the base tray is made out of material other than cardboard, the front angle flap would measure 90 to 125° or preferably around 115°, with the top ramp being either corrugated, and in that case a rigid angle of 90 to 125° or preferably approximately 115° to nest with the firm tray, or if wood, bamboo, compressed paper plastic or plywood, it would be bent to the same angle/nesting, and the top walking surface could be attached to the top ramp by Velcro, or an adhesive, or by staples or other attachments.

Another embodiment of the outer tray could be a compressed paper product which resists moisture. A light spray of wax could be sprayed on the tray to add moisture resistance to the tray.

Another preferred embodiment would be a ramp that is made out on the same material as the animal litter box described and attaches to the front opening of the wall portion of the animal litter box.

The animal litter box 10 has an alternative embodiment that includes the use of a ramp to capture tracked litter, to clean paws, and to facilitate entering and exiting the animal litter box 10. FIGS. 16a, 16b, 16c, and 16d, shows one preferred embodiment that is designed specifically for use with animal litter box 10. As shown in FIGS. 16a, 16b, 16c, and 16d, the ramp 160 is attachable and detachable by including a living hinge 167. On each side of the living hinge is a female attachment, the litter box attachment 168, and the ramp attachment, 169. The ramp 160 itself has two vertical longitudinal side walls 161 that can vary in size and shape, that corral the animal and encourage the animal to use the ramp getting in and out of the litter box, one vertical transverse back wall 163, a bottom 165, and a ramp insert reservoir 170 that accepts and retains a ramp insert 171. The ramp insert 170 is rectangular and can be made of various materials that are acceptable to animal's paws including, but not limited to corrugated cardboard or a sea grass carpet.

From the top inside edge of the vertical side walls 161 moving down, the surface takes a 90° bend inward and another 90° bend downward creating a narrow insert border 162 to meet the bottom 165. Animals tend to track litter and dust out of the litter box. The ramps 160 and 172 are designed to clean the animal's paws, and to loosen and capture any litter and dust. The litter collects at the end of the ramp in the catch space. As demonstrated in FIG. 16C, empty the captured litter from out of the ramp and back into the litter box by lifting the end of the ramp with the handle 164, and pouring litter back into litter box. Then lower ramp back down.

An alternate embodiment of ramp 160 is the same ramp as above, however, the vertical side walls 161 continue straight down from the top edge and meet the bottom 165 at 90° with a small fillet to facilitate easy cleaning, and the side walls 161 become one with the ramp insert reservoir walls. There is no insert border 102 in this second embodiment.

Figure 23:
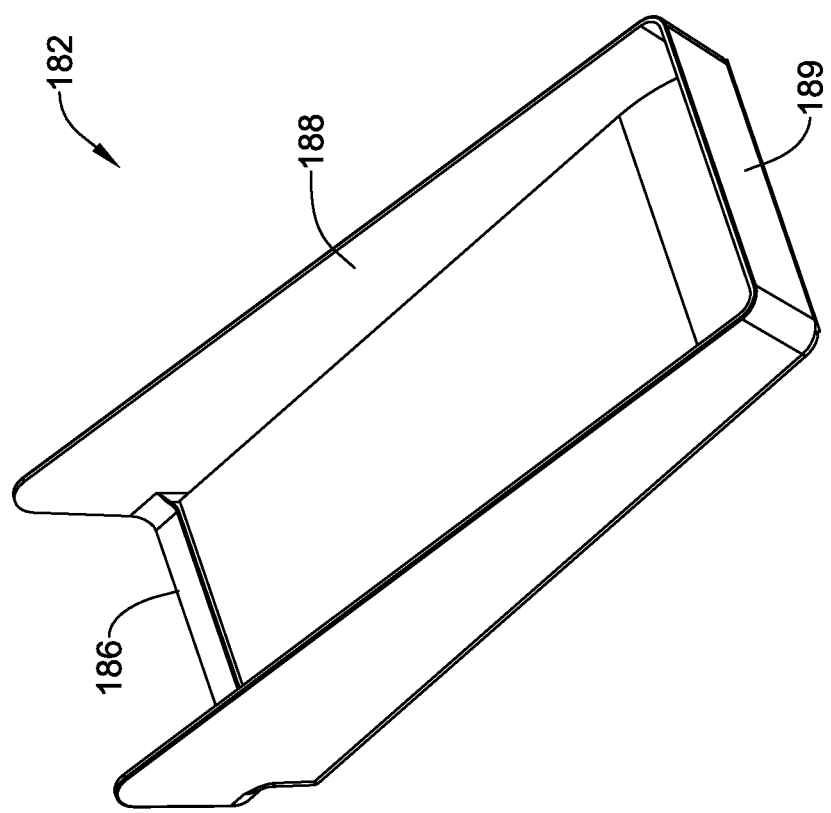
FIG. 23 is a perspective view of an alternative ramp.
Figure 24:
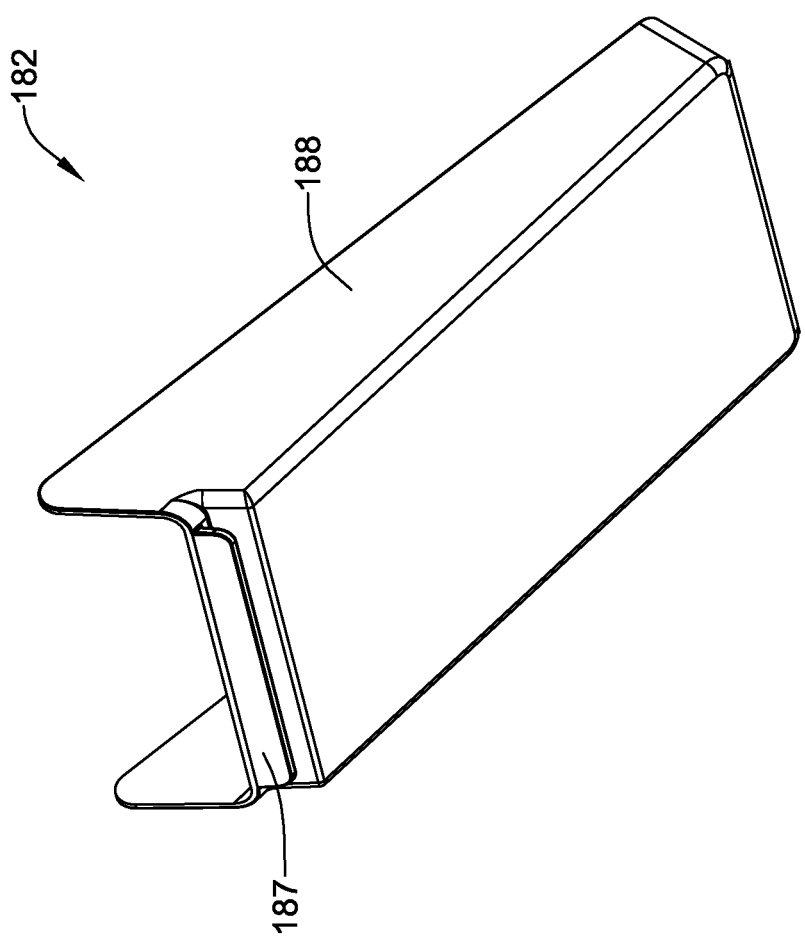
FIG. 24 is a perspective view of the underside of the ramp of FIG. 23.
Figure 25:
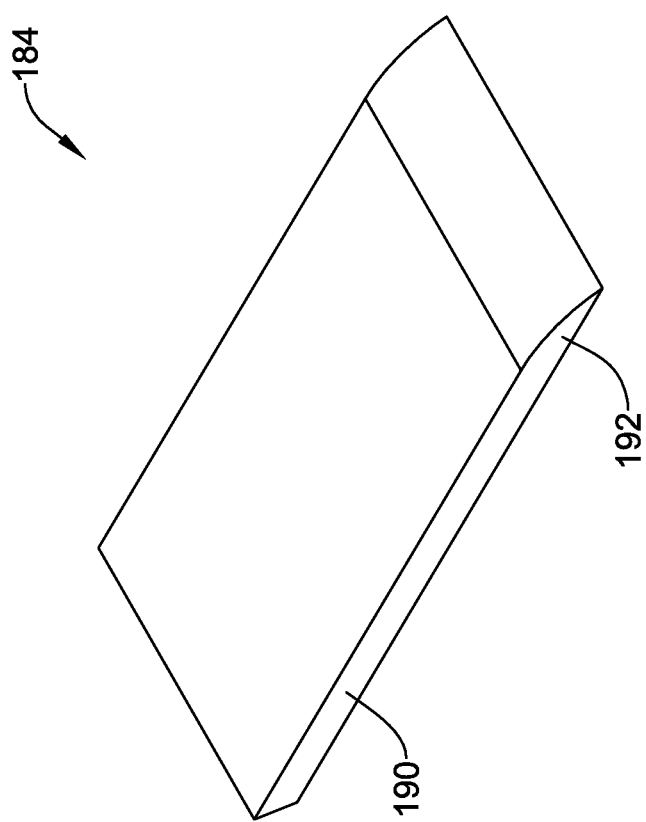
FIG. 25 is a perspective view of a ramp insert.

FIGS. 23-25 depict another alternative embodiment of a ramp for use with and made of the same materials as litter boxes 10 and 10A. The ramp 182 has 2 vertical sidewalls 188, one vertical backwall 189, and an angled short front wall 185 that goes up to a flat edge 186. FIG. 25 shows the ramp insert 184, which resides within the bottom of ramp 182, as shown in FIG. 23. The insert 184 has 2 longitudinal flat edges 190 that contact the inside of the ramp 182 sidewalls 188 and an angled front edge 191, that will contact and be retained by the angled front wall 185, and a tapered end 192 creating space for captured litter. FIG. 23 shows the attachment flap 187, which lays over the vertical front wall 2aa of the litter box 10 or 10A. This allows easy attachment of the ramp 187 to litter box 10 or 10A and easy removal of the ramp 187 to allow emptying of captured litter back into the litter box. The insert may be removably attached to the bottom of the ramp using an adhesive.

Another preferred embodiment of the animal litter box 10 and 10A includes ramp 172 shown in FIGS. 17A and 17B. This embodiment is useful for any litter box with an 8 inch or greater opening for animals entering or exiting, and rests on the edge of the litter box without using a living hinge. It has 2 parts, including the lightweight outer tray 173 and the inner ramp 177. The outer tray 173 has 2 side walls 174 and back wall 175 and a bottom. In this example, the outer tray, 173, has front moveable flap 176 that can adapt to whichever angle is required for resting on a litter box entrance edge. The rigid inner ramp 177 has a 115° angle bend 181, and nests by resting on top of the outer tray 173. The front edge of the inner ramp 177, nests over the tray flap 176, which rests over the entrance edge of a litter box. This facilitates the ingress and egress from the litter box of animals of all ages and abilities, including kittens, senior cats, and cats with mobility problems. The outer tray 173 can be made with multiple materials including but not limited to corrugated cardboard, wood, plywood, compressed paper and compressed wood. The inner ramp 177 could also be made with multiple materials including, but not limited to corrugated cardboard, compressed paper, compressed wood, seagrass, sisal, hemp or jute.

Another example of the ramp 172 is an outer tray 173 made out if a solid material such as, but not limited to wood, bamboo, or plywood, compressed paper, plastic or wood, and bent to an angle of preferably approximately 115°, or a range of 90° to 125°, and the nesting inner ramp 177 could be made out of corrugated cardboard, a material such as but not limited to wood, bamboo, plywood, compressed paper or wood and sisal, seagrass, hemp or jute. If the outer tray 173 is a material other than corrugated, the front angle flap 176 would measure preferably about 115°, with a range of 90° to 125°, and the inner ramp 177 would be bent to the same angle to allow a nesting of the two parts. The top surface of the inner ramp 177 may be attached using Velcro, adhesives, staples, or other. If the outer tray is made of corrugated or compressed paper, it may be sprayed with a light spray of wax to add moisture resistance.

What is claimed is:

1. A pelletized animal litter comprising birch bark waste, the birch bark waste including a mixture of about 50% to about 90% birch bark, including both inner and outer birch bark, and about 10% to about 60% birch bole wood.

2. The pelletized animal litter of claim 1, wherein a concentration of birch bark is between about 60% to about 90%.

3. The pelletized animal litter of claim 1, wherein a concentration of bole wood is between about 10% and about 40%.

4. The pelletized animal litter of claim 1, wherein a pelletizing compression ratio of the animal litter is about 6:1 to 9:1.

5. The pelletized animal litter of claim 4, wherein a durability of the animal litter is greater than 90%.

6. The pelletized animal litter of claim 5, wherein a sorbency of the animal litter is less than 25%.

7. The pelletized animal litter of claim 6, wherein an inhalable dust concentration of the animal litter is less than 10 mg/m$^3$.

8. A litter box system for use with an animal litter, the litter box system comprising:
- a bottom base;
- a drawer that slidably disposes within the bottom base, and which glides into and out of the bottom base, the drawer having a reservoir;
- a walled housing with at least three walls, and a front anterior wall with a cut out opening for an animal to go in and out which is removably disposed over the bottom base and engages via a perimeter flange wherein the walled housing has an open bottom that nests into the bottom base and an upper front of the drawer;
- a liquid permeable removable grate disposed within the walled housing, wherein the grate encourages the flow of liquid waste therethrough but prevents the passage of litter disposed thereon; and
- pelletized litter disposed on the removable grate, the pelletized litter comprising birch bark waste, the birch bark waste including a mixture of about 50% to about 90% birch bark, including both inner and outer birch bark, and about 10% to about 60% birch bole wood.

9. The litter box system of claim 8, further comprising a ramp that attaches to the front anterior wall cut out and facilitates entering and exiting of the box while capturing litter particulate and cleaning an animal's paws as they exit the box.

10. The litter box system of claim 8, wherein the grate includes rounded edges to facilitate liquid movement into the reservoir of the drawer.

11. The litter box system of claim 8, wherein the grate includes divots so it can be easily removed to pass the soiled litter into the reservoir of the drawer to dispose of the litter hygienically.

12. The litter box system of claim 11, wherein a volume defined by the drawer is greater than or equal to a volume of litter used in a standard litter box.

13. The pelletized animal litter of claim 1, wherein the mixture is ratio of 50% to 80% birch bark and 20% to 50% birch bole wood.

14. The pelletized animal litter of claim 1, further comprising one or more of hulls or shells of nuts, seeds, fruit, or grasses.

15. The pelletized animal litter of claim 14, wherein the hulls or shells of nuts, seeds, fruit, or grasses include one or more of coffee chaff, sunflower hulls, wild rice hulls, pistachio shells, and safflower hulls.

16. The pelletized animal litter of claim 1, further comprising other hardwood or softwood tree bark waste from one or more of aspen, pine, fir, or maple trees.

17. The pelletized animal litter of claim 1, wherein the mixture is a ratio of 60% birch bark and 40% birch bole wood.

18. The pelletized animal litter of claim 1, wherein a final pellet moisture concentration is 8% to 11%.

\* \* \* \* \*